United States Patent
Walker et al.

(10) Patent No.: US 8,826,093 B2
(45) Date of Patent: Sep. 2, 2014

(54) POWER SAVING METHOD FOR CODED TRANSMISSION

(75) Inventors: Gordon Kent Walker, Poway, CA (US); Chinnappa K. Ganapathy, San Diego, CA (US); Dhinakar Radhakrishnan, San Diego, CA (US); Fuyun Ling, San Diego, CA (US); Rajiv Vijayan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 965 days.

(21) Appl. No.: 11/335,013

(22) Filed: Jan. 18, 2006

(65) Prior Publication Data

US 2006/0195752 A1    Aug. 31, 2006

Related U.S. Application Data

(60) Provisional application No. 60/650,007, filed on Jan. 19, 2005, provisional application No. 60/660,721, filed on Mar. 10, 2005.

(51) Int. Cl.
*H04L 1/18* (2006.01)
*H04L 1/00* (2006.01)

(52) U.S. Cl.
CPC ............ *H04L 1/0053* (2013.01); *H04L 1/0057* (2013.01); *H04L 1/0071* (2013.01); *H04L 1/0045* (2013.01); *H04L 1/0083* (2013.01); *H04L 1/0065* (2013.01)
USPC ........... 714/748; 370/290; 370/292; 370/311; 370/242; 370/349; 455/343; 455/522; 455/574; 455/517; 455/127.5

(58) Field of Classification Search
CPC ............... H04J 11/00; H04J 3/04; H04J 3/06; H04J 3/16; H04L 1/18
USPC ......... 714/704, 758, 781, 714, 746, 748–749, 714/751–752, 799, 801; 709/231, 236; 370/395.1, 473, 394, 428–429, 370/277–278, 282, 290–292; 455/574, 343, 455/517, 522; 375/259
See application file for complete search history.

(56) References Cited

U.S. PATENT DOCUMENTS

| | | | |
|---|---|---|---|
| 6,223,047 B1 * | 4/2001 | Ericsson | 455/517 |
| 6,240,304 B1 * | 5/2001 | Blankenstein et al. | 455/574 |
| 6,446,234 B1 | 9/2002 | Cox et al. | |
| 6,526,531 B1 * | 2/2003 | Wang | 714/704 |
| 6,944,468 B2 * | 9/2005 | Okumura | 455/522 |
| 7,454,684 B2 * | 11/2008 | Allpress | 714/755 |
| 2002/0026618 A1 * | 2/2002 | Wang | 714/786 |

(Continued)

FOREIGN PATENT DOCUMENTS

| | | |
|---|---|---|
| JP | 2001-298480 | 10/2001 |
| JP | 2004-254127 | 9/2004 |
| JP | 2004-274214 A | 9/2004 |
| JP | 2004-274703 | 9/2004 |

OTHER PUBLICATIONS

Taiwan Search Report—TW095102073—TIPO—Nov. 28, 2011.

(Continued)

*Primary Examiner* — Michael T Vu
(74) *Attorney, Agent, or Firm* — Fulbright & Jaworski LLP

(57) ABSTRACT

Conserving power for coded transmissions comprises ceasing to process parity packets once associated data packets are deemed correct or corrected. Once data packets are deemed correct or corrected, the receiving unit can shut off during the transmission of parity packets.

29 Claims, 26 Drawing Sheets

(56) References Cited

U.S. PATENT DOCUMENTS

| | | |
|---|---|---|
| 2002/0094033 A1* | 7/2002 | Baggen et al. ............... 375/259 |
| 2002/0105960 A1 | 8/2002 | Das et al. |
| 2002/0181437 A1* | 12/2002 | Ohkubo et al. ............... 370/349 |
| 2003/0051204 A1* | 3/2003 | Maung et al. ................. 714/781 |
| 2004/0114599 A1* | 6/2004 | Yoon et al. .................. 370/395.1 |
| 2004/0153909 A1* | 8/2004 | Lim et al. ..................... 714/714 |
| 2004/0158794 A1* | 8/2004 | Niesen .......................... 714/758 |
| 2004/0162911 A1* | 8/2004 | Sperschneider et al. ...... 709/231 |

OTHER PUBLICATIONS

International Search Report and Written Opinion—PCT/US2006/001933, May 30, 2006, International Search Authority—European Patent Office, Rijswijk, Pays Bas.

Packet Recovery in High-Speed Networks Using Coding and Buffer Management, 1990, pp. 124-131, vol. 1, IEEE, Menlo Park.

Shacham et al., "Packet recovery in high-speed networks using coding and buffer management," Multiple Facets of Integration, San Francisco, Jun. 3-7, 1990, Proceedings of the Annual Joint Conference of the Computer and Communications Societies, vol. 2, pp. 124-131 (1990).

Shacham, "Packet recovery and error correction in high-speed wide-area networks." Proceedings of the Military Communications Conference, IEEE, pp. 551-557 (1989).

International Patent Application No. PCT/US2006/001933, International Search Report Applicant: QUALCOMM Incorporated, International Filing Date: Jan. 19, 2006, pp. 1-4.

* cited by examiner

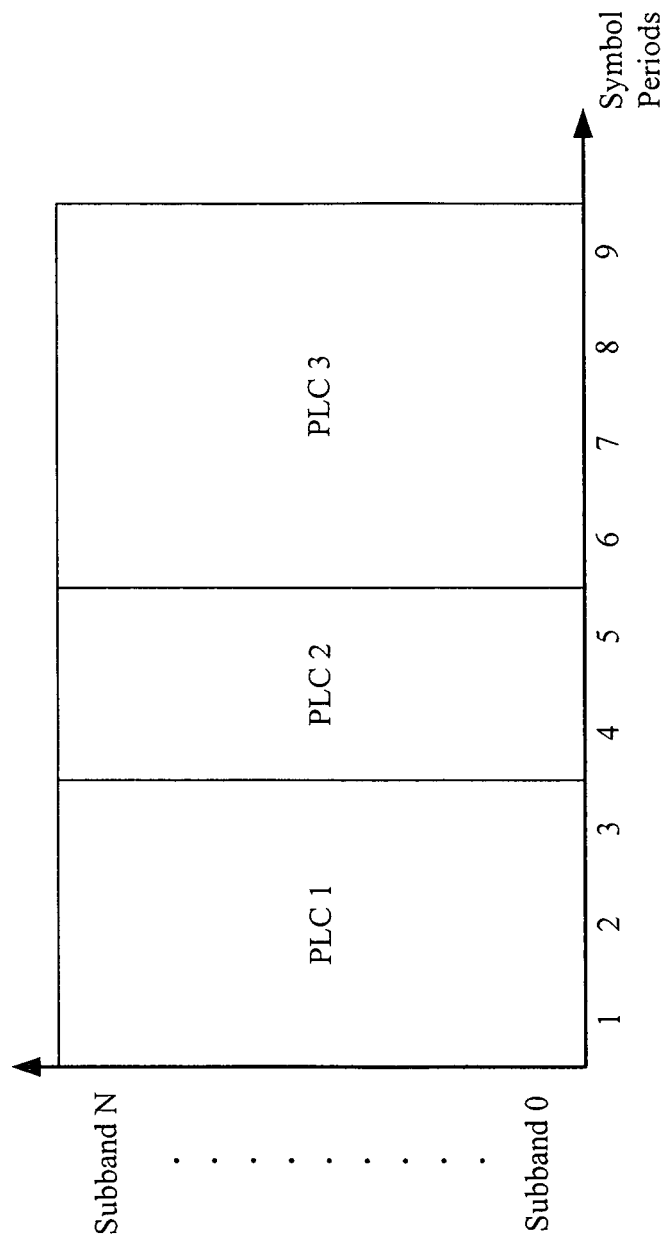

POWER SAVING METHOD FOR CODED TRANSMISSION

CLAIM OF PRIORITY UNDER 35 U.S.C. §119

This application claims the benefit of U.S. Provisional Application Ser. No. 60/650,007 entitled "POWER SAVING CODED TRANSMISSION," filed on Jan. 19, 2005, and U.S. Provisional Application Ser. No. 60/660,721 entitled "POWER SAVING CODED TRANSMISSION," filed on Mar. 10, 2005. The entireties of these applications are incorporated herein by reference.

REFERENCE TO CO-PENDING APPLICATIONS FOR PATENT

This application contains subject matter related to the following co-pending U.S. Patent Applications:

U.S. patent application Ser. No. 10/932,586, entitled "MULTIPLEXING AND TRANSMISSION OF MULTIPLE DATA STREAMS IN A WIRELESS MULTI-CARRIER COMMUNICATION SYSTEM," filed on Sep. 1, 2004; and U.S. patent application Ser. No. 10/968,613, entitled "METHOD AND APPARATUS FOR SEAMLESSLY SWITCHING RECEPTION BETWEEN MULTIMEDIA STREAMS IN A WIRELESS COMMUNICATION SYSTEM," filed on Oct. 18, 2004; the entireties of which are hereby incorporated by reference.

BACKGROUND

1. Field

The subject innovation relates generally to wireless communications, and more specifically to saving power for coded transmissions.

2. Background

In handheld mobile devices the power consumption of all systems is always a concern in a system with managed power. For example, in a unicast cellular network, resources are managed to make packet error rate a constant in the network. In a multicast network, the design has to serve the edge of coverage (weakest member), which results in many locations receiving high signal-to-noise ratios (SNRs). Thus, there is a need in the art to allow a majority of users to save power with no loss in performance.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. Various aspects disclosed herein address the above stated needs by allowing a majority of users to save power with no loss in performance via a selective decode of an outer code.

According to an aspect, a method can comprise receiving data packets and parity packets in a superframe, determining whether the data packets are correct, and decoding parity packets only if a data packet is determined to be incorrect. A parity packet may be associated with one or more data packets, and can be received to receiving the one or more data packets. Each data packet may comprise a cyclic redundancy check (CRC) segment that may be utilized to validate the data packet. The method can further comprise decoding the parity packet if at least one of the one or more data packets is invalid, as well as reducing power consumption by omitting a decode of the parity packet if all data packets are valid.

Another aspect relates to a system that facilitates conserving power during receipt of coded transmissions in a wireless communication environment, comprising a receiver that receives data packets and parity packets in a superframe, and a processor that determines whether to decode the parity packets based at least in part on information related to data packet corruption. Each parity packet may be associated with a plurality of data packets and may be received after the data packets associated therewith. The receiver decodes the data packets and employs a CRC to validate the data packets upon decoding. The processor evaluates data packet validity for each data packet to determine whether the data packet is corrupt. The receiver does not decode the parity packet if the processor indicates that the data packets associated with the parity packet are not corrupt.

According to a further aspect, a receiving unit is described, comprising means for receiving data packets and parity packets in a superframe, means for determining whether the data packets are correct, and means for decoding parity packets only if a data packet is determined to be incorrect. The means for receiving receives a set of data packets followed by an associated parity packet, and the means for determining comprises means for performing a CRC protocol. Alternatively, the means for receiving receives a parity packet prior to receiving an associated set of data packets. In this case, the receiving unit may further comprise means for buffering the parity packet, as well as means for deleting the parity packet from a buffer if the each of the data packets in the associated set of data packets is correct, and means for decoding the parity packet if one or more of the data packets in the associated set of data packets is incorrect.

Yet another aspect relates to a computer-readable medium embodying a method of wireless communications, comprising instructions for receiving data packets and parity packets in a superframe, determining whether the data packets are correct, and decoding parity packets only if a data packet is determined to be incorrect. The instructions may further comprise receiving a set of data packets prior to receiving an associated parity packet, and performing a CRC protocol on each data packet to determine whether the data packets are correct.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 5A shows a burst-TDM (time division multiplex) scheme;

DETAILED DESCRIPTION

Figure 1:
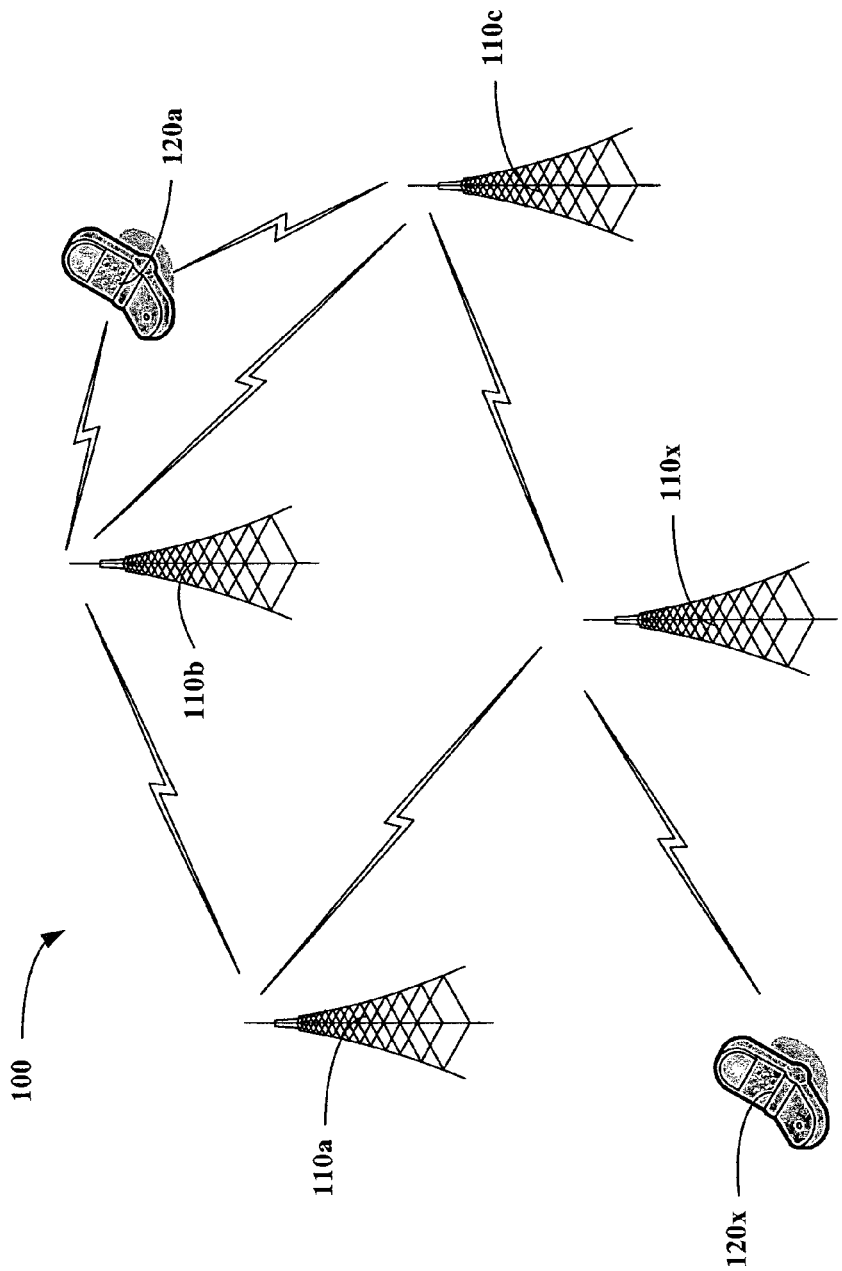
FIG. 1 shows a wireless multi-carrier system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

The word "exemplary" is used herein to mean "serving as an example, instance, or illustration." Any embodiment or design described herein as "exemplary" is not necessarily to be construed as preferred or advantageous over other embodiments or designs. The multiplexing and transmission techniques described herein may be used for various wireless multi-carrier communication systems. These techniques may also be used for broadcast, multicast, and unicast services. For clarity, these techniques are described for an exemplary multi-carrier broadcast system.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the subject innovation.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The acts comprised by a method or algorithm described in connection with the examples and/or aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The following description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects and/or features shown herein but is to be accorded the widest scope consistent with the principles and novel features disclosed herein.

Techniques for multiplexing and transmitting multiple data streams in a manner to facilitate power-efficient and robust reception of individual data streams by wireless devices are described herein. Each data stream is processed separately based on a coding and modulation scheme (e.g., an outer code, an inner code, and a modulation scheme) selected for that stream to generate a corresponding data symbol stream. This allows the data streams to be individually recovered by the wireless devices. Each data stream is also allocated certain amount of resources for transmission of that stream. The allocated resources are given in "transmission units" on a time-frequency plane, where each transmission unit corresponds to one subband in one symbol period and may be used to transmit one data symbol. The data symbols for each data stream are mapped directly onto the transmission units allocated to the stream. This allows the wireless devices to recover each data stream independently, without having to process the other data streams being transmitted simultaneously.

FIG. 1 shows a wireless multi-carrier broadcast system 100. System 100 includes a number of base stations 110 that are distributed throughout the system. A base station is generally a fixed station and may also be referred to as an access point, a transmitter, or some other terminology. Neighboring base stations may broadcast the same or different content. Wireless devices 120 are located throughout the coverage area of the system. A wireless device may be fixed or mobile and may also be referred to as a user terminal, a mobile station, user equipment, or some other terminology. A wireless device may also be a portable unit such as a cellular phone, a handheld device, a wireless module, a personal digital assistant (PDA), and so on.

A subscriber station, or "wireless device," as used herein, can also be called a subscriber unit, mobile station, mobile, remote station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Each base station 110 may broadcast multiple data streams simultaneously to wireless devices within its coverage area. These data streams may be for multimedia content such as video, audio, tele-text, data, video/audio clips, and so on. For example, a single multimedia (e.g., television) program may be sent in three separate data streams for video, audio, and data. A single multimedia program may also have multiple audio data streams, e.g., for different languages. For simplicity, each data stream is sent on a separate physical layer channel (PLC). There is thus a one-to-one relationship between data streams and PLCs. A PLC may also be called a data channel, a traffic channel, or some other terminology.

According to various aspects, transmission of the multiple data streams may occur in "superframes," with each superframe having predetermined time duration (e.g., on the order of a second or few seconds). Each superframe is further divided into multiple (e.g., two, four, or some other number of) frames. For each data stream, each data block is processed (e.g., outer encoded) to generate a corresponding code block. Each code block is partitioned into multiple subblocks, and each subblock is further processed (e.g., inner encoded and modulated) to generate a corresponding subblock of modulation symbols. Each code block is transmitted in one superframe, and the multiple subblocks for the code block are transmitted in the multiple frames of the superframe, one subblock per frame. The partitioning of each code block into multiple subblocks, the transmission of these subblocks over multiple frames, and the use of block coding across the subblocks of the code block provide robust reception performance in slowly time-varying fading channels.

Each data stream may be "allocated" a variable number of transmission units in each superframe depending on the stream's payload in the superframe, the availability of transmission units in the superframe, and possibly other factors. Each data stream is also "assigned" specific transmission units within each superframe using an assignment scheme that attempts to (1) pack the transmission units for all data streams as efficiently as possible, (2) reduce the transmission time for each data stream, (3) provide adequate time-diversity, and (4) minimize the amount of signaling to indicate the specific transmission units assigned to each data stream. Overhead signaling for various parameters of the data streams (e.g., the coding and modulation scheme used for each data stream, the specific transmission units assigned to each data stream, and so on) may be transmitted prior to each superframe and may also be embedded within the data payload of each data stream. This allows a wireless device to determine the time-frequency location of each desired data stream in the upcoming superframe. The wireless device may power on only when the desired data stream is transmitted, using the embedded overhead signaling, and thereby minimize power consumption.

Figure 2:
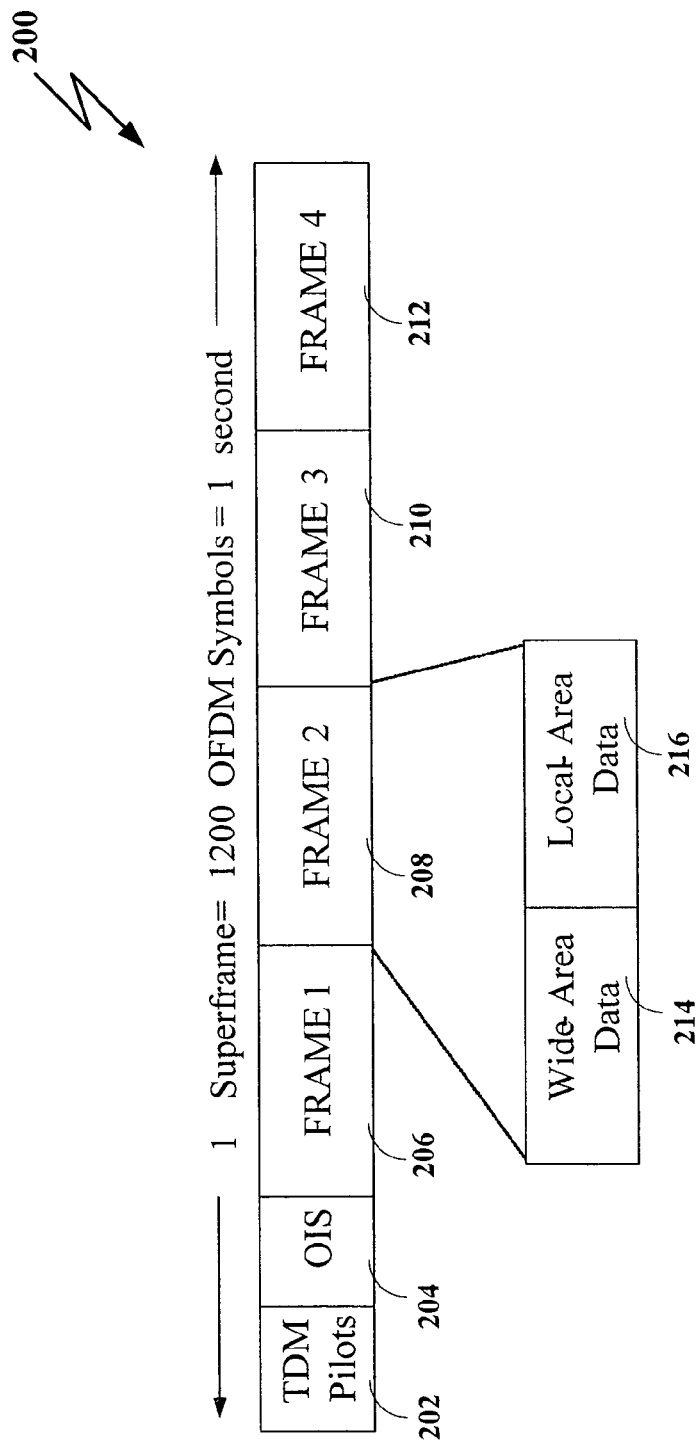
FIG. 2 shows an exemplary superframe structure.

FIG. 2 shows a graphical representation of a superframe structure 200 that may be used for broadcast system 100. In one aspect, a superframe comprises pilots 202, overhead information symbols (OIS) 204, and four frames 206, 208, 210, 212. In another aspect, each frame comprises wide-area data 214 and local-area data 216. Pilots are used for acquisition and cell identification, and OIS comprises overhead information. According to various aspects, OIS includes information about the location of MediaFlo logical channels (MLCs) in each frame. A superframe may comprise, for instance, 1200 OFDM symbols over a one-second duration. It will be apparent to those skilled in the art that a superframe may be defined to comprise a different number of OFDM symbols over a different period of time depending on design considerations. A superframe, exclusive of pilot and overhead frames, may comprise I frames, each of which in turn comprises packet(s). For example, the I frames may comprise j data packets and k parity packets, wherein the k parity packets are organized according to Reed-Solomon encoding protocols. Examples of Reed-Solomon encoding include RS(16, 12) and RS(16, 8), where RS(n, k) represents n total bits, k data bits, and (n-k) parity bits. Thus, RS(16, 12) refers to 16 total bits, 12 data bits, and 4 parity bits, and RS(16, 8) refers to 16 total bits, 8 data bits, and 8 parity bits.

According to various aspects, parity packets are located in the back of the superframe, in the front of the superframe, and or may be interspersed between data packets. Each packet may additionally comprise a CRC that is utilized to determine whether the packet is correct, or free of bit errors. If all of the data packets are determined to be correct, then there is no need for a receiving unit to waste time and power decoding the parity packets. Thus, the receiving unit may cease processing of the parity packets once the data packets are deemed correct. A receiver can determine whether data is correct in hardware, software, or a combination of both. Generally, hardware can determine whether the data is correct more quickly than software can determine whether the data is correct. Additionally, the receiver may buffer the parity packets and decide whether to decode the parity packets after determining whether the data packets are correct. According to a further aspect, the receiver may buffer the data packets as well as the parity packets, and may decode the parity packets only after determining whether the data packets corresponding to the parity packets are correct. With any of these aspects, using parity bits encoded with Reed-Solomon encoding, any incorrect packet can be corrected by employing a correct parity packet. Thus, once all of the data packets have been corrected, the receiver no longer need process parity packets. For instance, once k of n packets are deemed correct, the receiver ceases processing of the parity packets.

Each superframe has a predetermined time duration, which may be selected based on various factors such as, for example, the desired statistical multiplexing for the data streams, the desired amount of time diversity, acquisition time for the data streams, buffer requirements for the wireless devices, and so on. A larger superframe size provides more time diversity and better statistical multiplexing of the data streams being transmitted, so that less buffering may be required for individual data streams at the base station. However, a larger superframe size also results in a longer acquisition time for a new data stream (e.g., at power-on or when switching between data streams), requires larger buffers at the wireless devices, and also has longer decoding latency or delay. A superframe size of approximately one second may provide good tradeoff between the various factors described above. However, other superframe sizes (e.g., a quarter, a half, two, or four seconds) may also be used. Each superframe is further divided into multiple, substantially equal-sized frames.

The data stream for each physical layer channel (PLC) such as an MLC, is encoded and modulated based on a coding and modulation scheme selected for that PLC. In general, a coding and modulation scheme comprises all of the different types of encoding and modulation to be performed on a data stream. For example, a coding and modulation scheme may comprise a particular coding scheme and a particular modulation scheme. The coding scheme may comprise error detection coding (e.g., a cyclic redundancy check (CRC)), forward error correction coding, and so on, or a combination thereof. The coding scheme may also indicate a particular code rate of a base code. In an aspect that is described below, the data stream for each PLC is encoded with a concatenated code comprised of an outer coder and an inner code and is further modulated based on a modulation scheme. As used herein, a "mode" refers to a combination of an inner code rate and a modulation scheme.

It will be appreciated that each superframe may be preceded by a pilot and overhead section. For instance, the section may include (1) one or more pilot OFDM symbols used by the wireless devices for frame synchronization, frequency acquisition, timing acquisition, channel estimation, and so on, and (2) one or more overhead OFDM symbols used to carry overhead signaling information for the associated (e.g., immediately following) superframe. The overhead information indicates, for example, the specific PLCs being transmitted in the associated superframe, the specific portion of the superframe used to send the data block(s) for each PLC, the outer code rate and mode used for each PLC, and so on. The overhead OFDM symbol(s) carries overhead signaling for all PLCs sent in the superframe. The transmission of the pilot and overhead information in a time division multiplexed (TDM) manner allows the wireless devices to process this section with minimal ON time. In addition, overhead information pertaining to each PLC's transmission in the next superframe may be embedded in one of the PLC's transmitted data blocks in the current superframe. The embedded overhead information allows the wireless device to recover the PLC's transmission in the next superframe without having to check the overhead OFDM symbol(s) sent in that superframe. Thus, the wireless devices may initially use the overhead OFDM symbols to determine the time-frequency location of each desired data stream, and may subsequently power on only during the time that the desired data stream is transmitted using the embedded overhead signaling. These signaling techniques may provide significant savings in power consumption and allow the wireless devices to receive content using standard batteries. Since the outer code rate and mode used for each PLC typically do not vary on a superframe basis, the outer code rate and mode may be sent on a separate control channel and do need not be sent in every superframe.

Although FIG. 2 shows a specific superframe structure, a superframe may be defined to be of any time duration and may be divided into any number of frames. Pilot and overhead information may also be sent in other manners different from the manner shown in FIG. 2. For example, overhead information may be sent on dedicated subbands using frequency division multiplexing (FDM).

According various other aspects described herein, a system utilizes concatenated codes and utilizes a cyclic redundancy code (CRC) or other error detection mechanisms to determine whether an outer code needs to be applied. When a receiver determines that all the data spanned by outer block code is correct the outer block code is not decoded. When the structure of the physical layer utilizes a block interleaver, entire frames of data may not need to be received, thus further increasing the power saving. The method may be applied in systems with convolution interleavers, but the temporal location of the data in the physical layer becomes diffuse and reduces the total power savings possible to some degree.

Packets encoded with typically a convolutional or turbo code have a CRC or similar error detection mechanism that allows detection of an individual packet as to correct reception. In a system where the reception time or position of the Reed Solomon or other block coded outer code data related to the first received inner coded data is known or predictable, the reception of the parity data is terminated to save power in accordance with an embodiment.

In a system that segregates the parity data in time, additional benefit is achieved by shutting off the receive circuits during the transmission of the parity data in accordance with an embodiment. In an embodiment, if the system has the systematic and parity data in separate frames, entire frames may be dropped. In an embodiment, if there are mixed frames of systematic and parity data, these mixed frames may be partially decoded. In addition, if only x additional packets of parity data are required to successfully decode a block, the reception of parity data may be terminated upon reception of x packets.

Figure 3A:
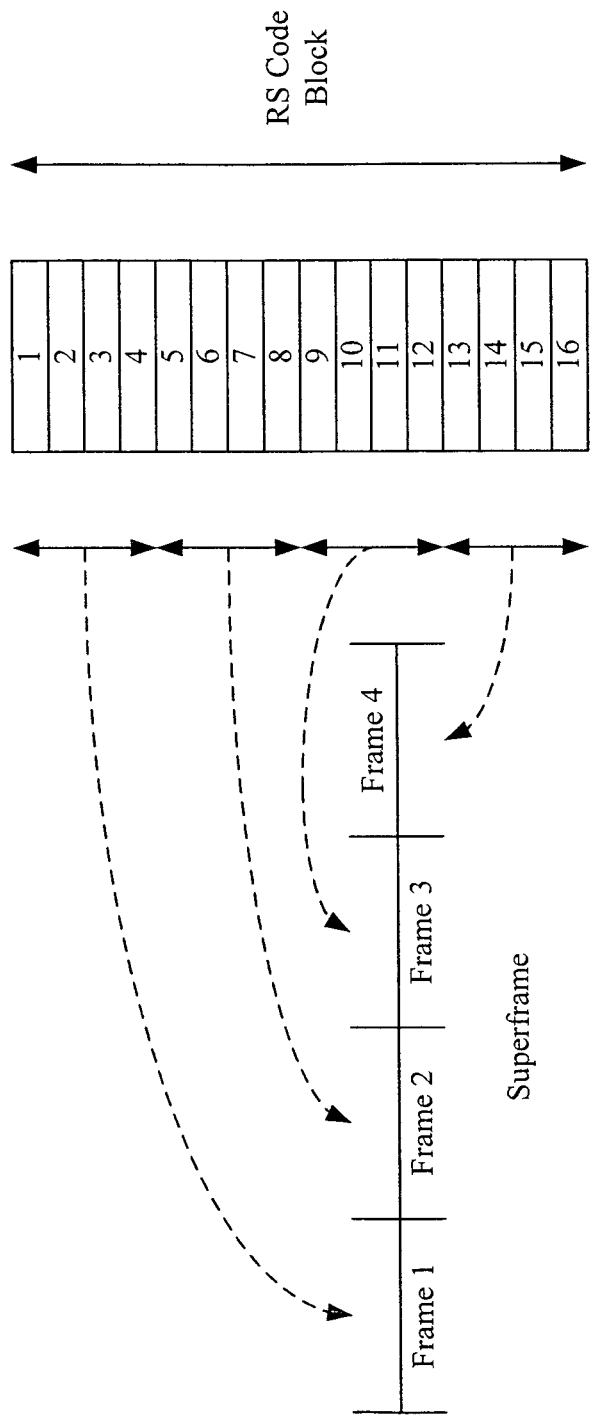
FIGS. 3A and 3B illustrate transmission of one data block and multiple data blocks, respectively, on a physical layer channel (PLC) in a superframe.

FIG. 3A illustrates the transmission of a data block on a PLC in a superframe. The data stream to be sent on the PLC is processed in data blocks. Each data block contains a particular number of information bits and is first encoded using an outer code to obtain a corresponding code block. Each code block is partitioned into four subblocks, and the bits in each subblock are further encoded using an inner code and then mapped to modulation symbols, based on the mode selected for the PLC. The four subblocks of modulation symbols are then transmitted in the four frames of one superframe, one subblock per frame. The transmission of each code block over four frames provides time diversity and robust reception performance in a slowly time-varying fading channel.

Figure 3B:
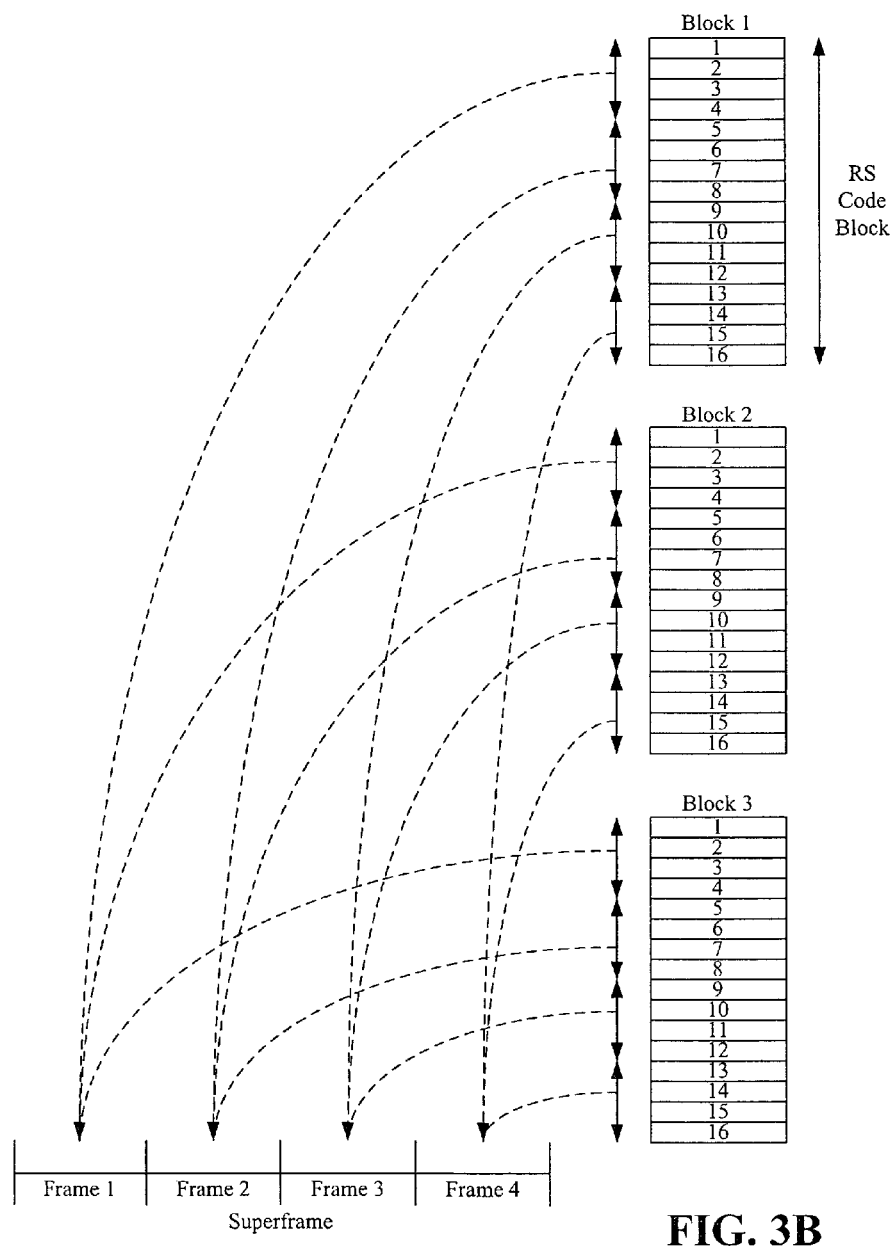

FIG. 3B illustrates the transmission of multiple ($N_{bl}$) data blocks on a PLC in a superframe. Each of the $N_{bl}$ data blocks is encoded separately using the outer code to obtain a corresponding code block. Each code block is further partitioned into four subblocks, which are inner encoded and modulated based on the mode selected for the PLC and then transmitted in the four frames of one superframe. For each frame, $N_{bl}$ subblocks for the $N_{bl}$ code blocks are transmitted in a portion of the frame that has been allocated to the PLC.

Each data block may be encoded and modulated in various manners. An exemplary concatenated coding scheme is described below. To simplify the allocation and assignment of resources to the PLCs, each code block may be divided into four equal-sized subblocks that are then transmitted in the same portion or location of the four frames in one superframe. In this case, the allocation of a superframe to the PLCs is equivalent to the allocation of a frame to the PLCs. Hence, resources can be allocated to the PLCs once every superframe. Each PLC may be transmitted in a continuous or non-continuous manner, depending on the nature of the data stream being carried by that PLC. Thus, a PLC may or may not be transmitted in any given superframe. For each superframe, an "active" PLC is a PLC that is being transmitted in that superframe. Each active PLC may carry one or multiple data blocks in the superframe.

Figure 4:
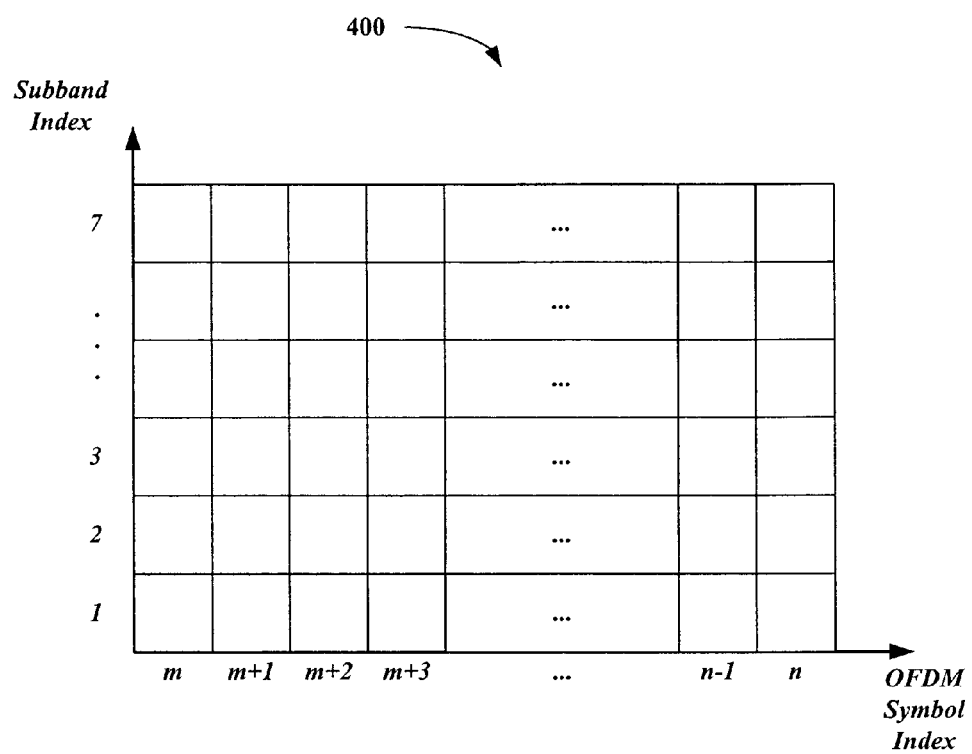
FIG. 4 shows a frame structure in a time-frequency plane.

FIG. 4 shows the structure 400 of one frame on a time-frequency plane. The horizontal axis represents time, and the vertical axis represents frequency. Each frame has a predetermined time duration, which is given in units of OFDM symbol periods (or simply, symbol periods). Each OFDM symbol period is the time duration to transmit one OFDM symbol (described below). The specific number of symbol periods per frame ($N_{spf}$) is determined by the frame duration and the symbol period duration, which in turn is determined by various parameters such as the overall system bandwidth, the total number of subbands ($N_{tsb}$), and the cyclic prefix length (described below). In an embodiment, each frame has a duration of 297 symbol periods (or $N_{spf}$=297). Each frame also covers the $N_{tsb}$ total subbands, which are given indices of 1 through $N_{tsb}$.

With OFDM, one modulation symbol may be sent on each subband in each symbol period, e.g., each transmission unit. Of the $N_{tsb}$ total subbands, $N_{dsb}$ subbands may be used for data transmission and are referred to as "data" subbands, $N_{psb}$ subbands may be used for pilot and are referred to as "pilot" subbands, and the remaining $N_{gsb}$ subbands may be used as "guard" subbands (e.g., no data or pilot transmission), where $N_{tsb}=N_{dsb}+N_{psb}+N_{gsb}$. The number of "usable" subbands is equal to the number of data and pilot subbands, or $N_{usb}=N_{dsb}+N_{psb}$. In an embodiment, broadcast system 100 utilizes an OFDM structure having 4096 total subbands ($N_{tsb}$=4096), 3500 data subbands ($N_{dsb}$=3500), 500 pilot subbands ($N_{psb}$=500), and 96 guard subbands ($N_{gsb}$=96). Other OFDM structures with different number of data, pilot, usable, and total subbands may also be used. In each OFDM symbol period, $N_{dsb}$ data symbols may be sent on the $N_{dsb}$ data subbands, $N_{psb}$ pilot symbols may be sent on the $N_{psb}$ pilot subbands, and $N_{gsb}$ guard symbols are sent on the $N_{gsb}$ guard subbands. As used herein, a "data symbol" is a modulation symbol for data, a "pilot symbol" is a modulation symbol for pilot, and a "guard symbol" is a signal value of zero. The pilot symbols are known a priori by the wireless devices. The $N_{dsb}$ data symbols in each OFDM symbol may be for one or multiple PLCs.

In general, any number of PLCs may be transmitted in each superframe. For a given superframe, each active PLC may carry one or multiple data blocks. According to one aspect, a specific mode and a specific outer code rate is used for each active PLC, and all data blocks for the PLC are encoded and modulated in accordance with this outer code rate and mode to generate corresponding code blocks and subblocks of modulation symbols, respectively. According to another aspect, each data block may be encoded and modulated in accordance with a specific outer code rate and mode to generate a corresponding code block and subblocks of modulation symbols, respectively. In any case, each code block contains a specific number of data symbols, which is determined by the mode used for that code block.

Each active PLC in a given superframe is allocated a specific amount of resources to transmit that PLC in the superframe. The amount of resources allocated to each active PLC may depend on (1) the number of code blocks to be sent on the PLC in the superframe, (2) the number of data symbols in each code block, and (3) the number of code blocks, along with the number of data symbols per code block, to be sent on other PLCs. Resources may be allocated in various manners. Two exemplary allocation schemes are described below.

FIG. 5A shows a burst-TDM allocation scheme. For this scheme, each active PLC is allocated all $N_{dsb}$ data subbands in one or more OFDM symbol periods. For the example shown in FIG. 5A, PLC 1 is allocated all data subbands in symbol periods 1 through 3, PLC 2 is allocated all data subbands in symbol periods 4 and 5, and PLC 3 is allocated all data subbands in symbol periods 6 through 9. For this scheme, each OFDM symbol contains data symbols for only one PLC. The bursts of OFDM symbols for different PLCs are time division multiplexed within a frame.

If consecutive OFDM symbols are assigned to each active PLC, then the burst-TDM can minimize the transmission time for the PLCs. However, the short transmission time for each PLC may also result in reduced time-diversity. Since an entire OFDM symbol is allocated to one PLC, the granularity of the resource allocation (e.g., the smallest unit that may be allocated to a PLC) for each frame is one OFDM symbol. The number of information bits that may be sent in one OFDM symbol is dependent on the mode used to process the information bits. For the burst-TDM scheme, the granularity of the allocation is then dependent on mode. The granularity is larger for higher order modes that are capable of carrying more information bits per data symbol. In general, a larger granularity adversely impacts "packing" efficiency, which refers to the percentage of the frame that is actually used to carry data. If an active PLC does not require the data-carrying capacity of an entire OFDM symbol, then the excess capacity is wasted and reduces packing efficiency.

Figure 5B:
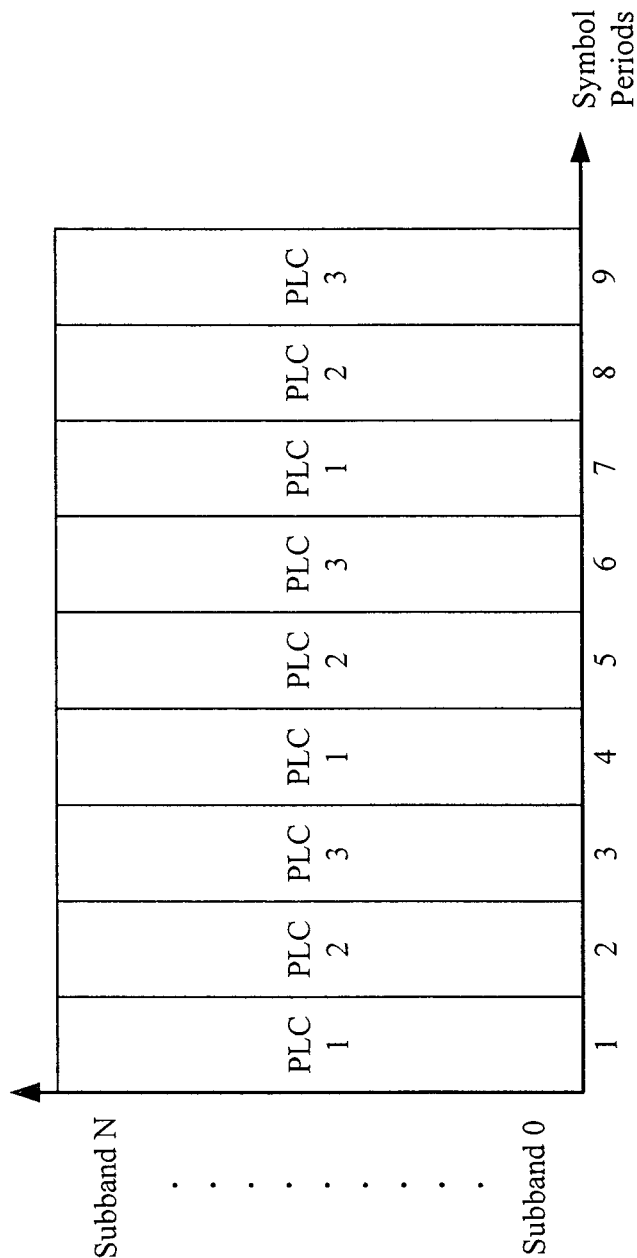
FIG. 5B shows a cycled-TDM scheme.

FIG. 5B shows a cycled-TDM allocation scheme. For this scheme, the active PLCs in the superframe are arranged into L groups, where L>1. A frame is also divided into L sections, and each PLC group is assigned to a respective section of the frame. For each group, the PLCs in the group are cycled through, and each PLC is allocated all $N_{dsb}$ data subbands in one or more OFDM symbol periods in the assigned section. For the example shown in FIG. 5B, PLC 1 is allocated all data subbands in symbol period 1, PLC 2 is allocated all data subbands in symbol period 2, PLC 3 is allocated all data subbands in symbol period 3, PLC 1 is allocated all data subbands in symbol period 4, and so on. Compared to burst-TDM, the cycled-TDM scheme may provide more time diversity, reduce receiver buffering requirements and peak decoding rate, but increase the receiver on-time to receive a given PLC.

Figure 5C:
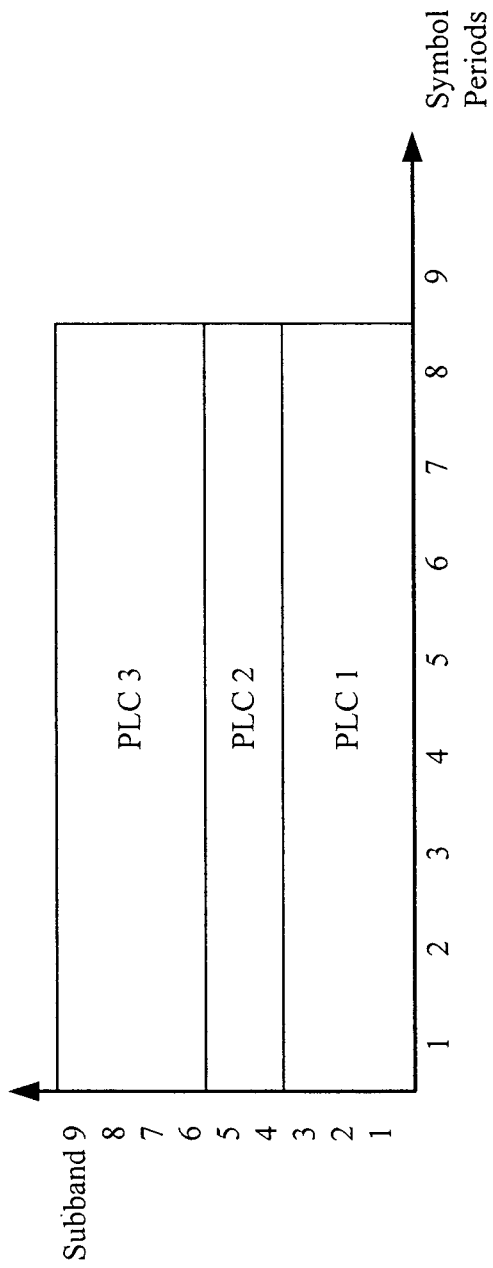
FIG. 5C shows a burst-TDM/FDM (frequency division multiplex) scheme.

FIG. 5C shows a burst-TDM/FDM allocation scheme. For this scheme, each active PLC is allocated one or more data subbands in one or more symbol periods. For the example shown in FIG. 5C, PLC 1 is allocated data subbands 1 through 3 in symbol periods 1 through 8, PLC 2 is allocated data subbands 4 and 5 in symbol periods 1 through 8, and PLC 3 is allocated data subbands 6 through 9 in symbol periods 1 through 8. For the burst-TDM/FDM scheme, each OFDM symbol may contain data symbols for multiple PLCs. The bursts of data symbols for different PLCs are time and frequency division multiplexed within a frame.

Since the payload of each PLC may be distributed over time as well as frequency, the burst-TDM/FDM scheme may increase the transmission time for the PLC. However, this also provides more time diversity. The transmission time for each PLC may be reduced by allocating more subbands to the PLC. For the burst-TDM/FDM scheme, the granularity of the resource allocation may be selected based on a tradeoff in between packing efficiency and overhead signaling. In general, smaller granularity results in better packing efficiency but also requires more overhead signaling to indicate the resources allocated to each PLC. The inverse is generally true with larger granularity. The description below assumes the use of the burst-TDM/FDM scheme.

In an embodiment, the $N_{usb}$ usable subbands are divided into $N_{gr}$ groups of usable subbands. One of the $N_{gr}$ groups may then contain the pilot subbands. For the remaining groups, the number of data subbands in one group determines the granularity of the resource allocation. The $N_{usb}$ usable subbands may be arranged into the $N_{gr}$ groups in various manners. In one subband grouping scheme, each group contains $N_{spg}$ consecutive usable subbands, where $N_{usb}=N_{gr} \cdot N_{spg}$. In another subband grouping scheme, each group contains $N_{spg}$ usable subbands that are pseudo-randomly distributed across the $N_{usb}$ usable subbands. In yet another subband grouping scheme, each group contains $N_{spg}$ usable subbands that are uniformly spaced across the $N_{usb}$ usable subbands.

Figure 6:
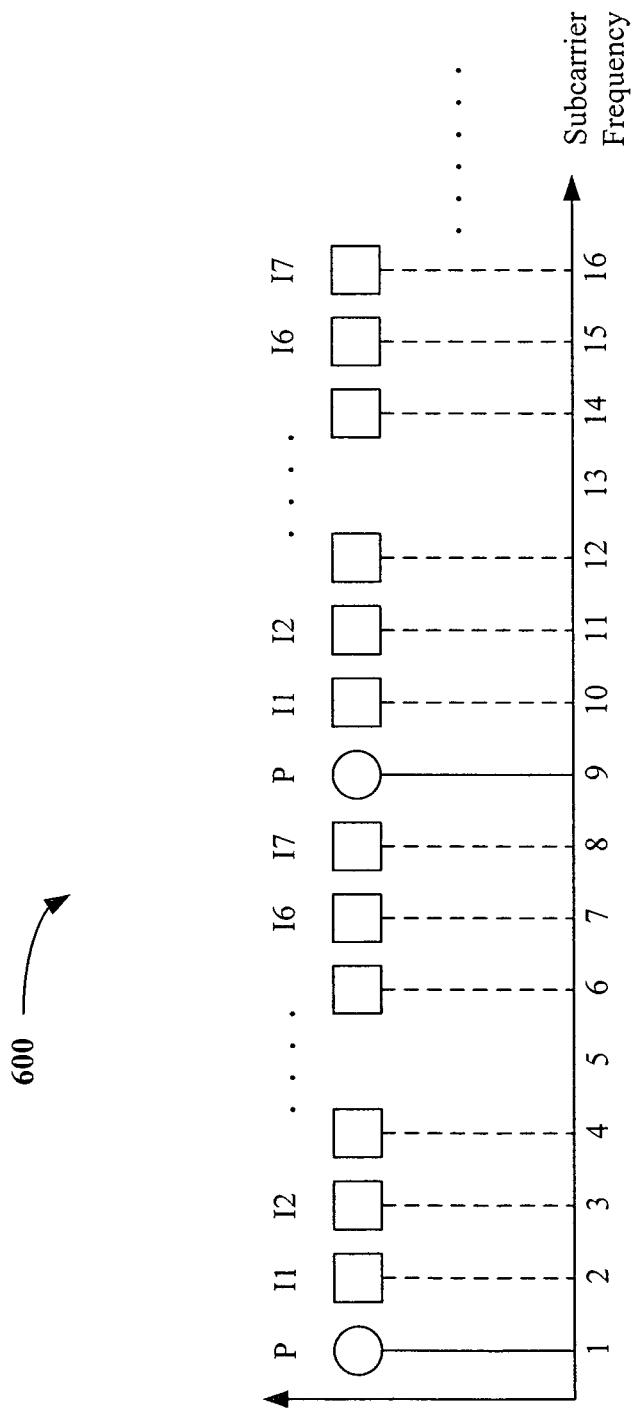
FIG. 6 shows an interlaced subband structure.

FIG. 6 shows an interlaced subband structure 600 that may be used for the burst-TDM/FDM scheme. The $N_{usb}$ usable subbands are arranged into $N_{gr}$ disjoint groups, which are labeled as subband groups 1 through $N_{gr}$. The $N_{gr}$ subband groups are disjoint in that each of the $N_{usb}$ usable subbands belongs to only one group. Each subband group contains $N_{spg}$ usable subbands that are uniformly distributed across the $N_{usb}$ total usable subbands such that consecutive subbands in the group are spaced apart by $N_{sp}$ subbands. For example, the 4000 usable subbands ($N_{usb}=4000$) may be arranged into eight groups ($N_{gr}=8$), each group contains 500 usable subbands ($N_{spg}=500$), and the usable subbands for each group are spaced apart by eight subbands ($N_{sp}=8$). The usable subbands in each group are thus interlaced with the usable subbands in the other $N_{gr}-1$ groups. Each subband group is also referred to as an "interlace".

The interlaced subband structure provides various advantages. First, better frequency-diversity is achieved since each group includes usable subbands from across the entire system bandwidth. Second, a wireless device may recover data symbols sent on each subband group by performing a "partial" (e.g., 512-point) fast Fourier transform (FFT) instead of a full (e.g., 4096-point) FFT, which may reduce the power consumed by the wireless device. Techniques for performing a partial FFT are described in commonly assigned U.S. patent application Ser. No. 10/775,719, entitled "Subband-Based Demodulator for an OFDM-based Communication System," filed Feb. 9, 2004. The following description assumes the use of the interlaced subband structure shown in FIG. 6.

Each PLC may be allocated resources on a superframe-by-superframe basis. The amount of resources to allocate to each PLC in each superframe is dependent on the payload of the PLC for that superframe. A PLC may carry a fixed-rate data stream or a variable-rate data stream. According to an example, a same mode is used for each PLC even if the data rate of the data stream carried by that PLC changes, in order to ensure that the coverage area for the data stream remains approximately constant regardless of data rate, so that reception performance is not dependent on data rate. The variable rate nature of a data stream is handled by varying the amount of resources allocated to the PLC in each superframe.

Each active PLC is allocated resources from the time-frequency plane, as shown in FIG. 4. The allocated resources for each active PLC may be given in units of "transmission slots" (or simply, "slots"). A slot corresponds to one group of (e.g., 500) data subbands or, equivalently, one group of modulation symbols in one symbol period. $N_{gr}$ slots are available in each symbol period and may be assigned slot indices 1 through $N_{gr}$. Each slot index may be mapped to one subband group in each symbol period based on a slot-to-interlace mapping scheme. One or more slot indices may be used for an FDM pilot, and the remaining slot indices may be used for the PLCs. The slot-to-interlace mapping may be such that the subband groups (or interlaces) used for the FDM pilot have varying distances to the subband groups used for each slot index. This allows all slot indices used for the PLCs to achieve similar performance.

Each active PLC is allocated at least one slot in a superframe. Each active PLC is also assigned specific slot(s) in the superframe. The "allocation" process provides each active PLC with the amount or quantity of resources, whereas the "assignment" process provides each active PLC with the specific resources within the superframe. For clarity, allocation and assignment may be viewed as separate processes. In practice, allocation and assignment are typically performed jointly since allocation may be affected by assignment, and vice versa. In any case, the assignment may be performed in a manner to achieve the following goals: (1) minimization of the transmission time for each PLC to reduce ON time and power consumption by the wireless devices to recover the PLC; (2) maximization of time-diversity for each PLC to provide robust reception performance; (3) constraint of each PLC to be within a specified maximum bit rate; and (4) minimization of buffering requirements for the wireless devices.

The maximum bit rate indicates the maximum number of information bits that may be transmitted in each OFDM symbol for one PLC. The maximum bit rate is typically set by the decoding and buffering capabilities of the wireless devices. Constraining each PLC to be within the maximum bit rate ensures that the PLC can be recovered by wireless devices having the prescribed decoding and buffering capabilities. In order to mitigate conflicts between various goals described above, a resource allocation/assignment scheme may be employed to achieve a balance between conflicting goals and may allow for flexibility in the setting of priority.

Each active PLC in a superframe is allocated a certain number of slots based on the payload of the PLC. Different PLCs may be allocated different numbers of slots. The specific slots to assign to each active PLC may be determined in various manners. Some exemplary slot assignment schemes are described below.

Figure 7A:
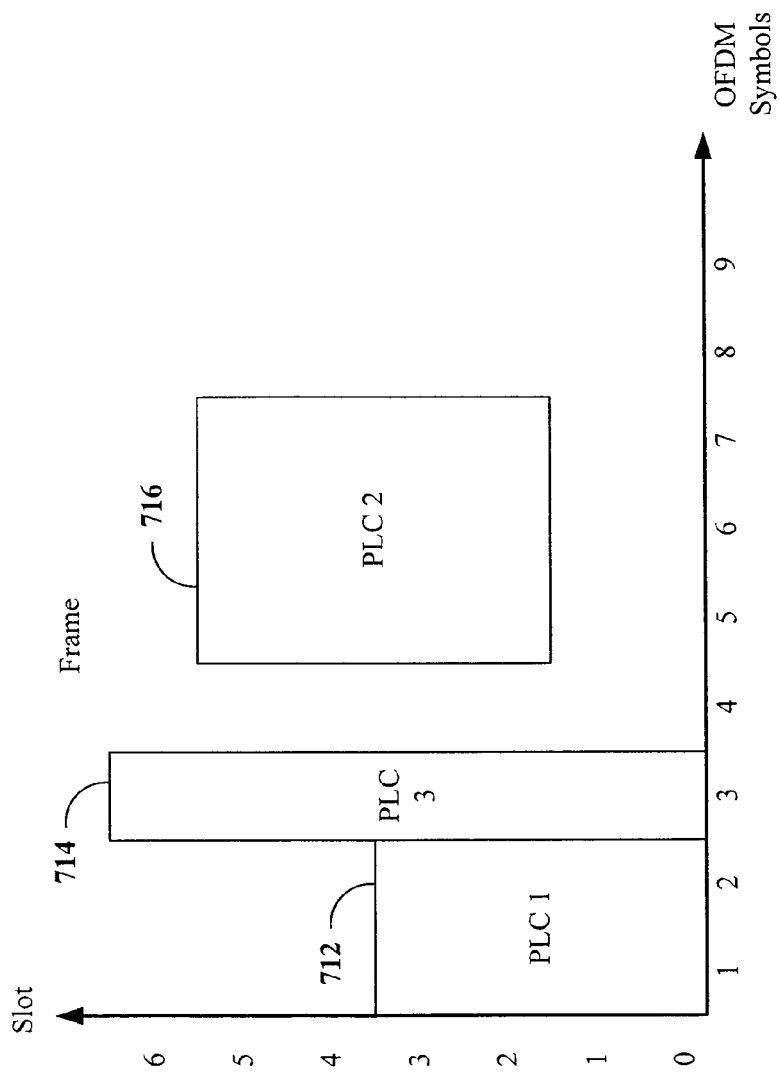
FIG. 7A shows assignment of slots to PLCs in rectangular patterns.

FIG. 7A shows assignment of slots to PLCs in rectangular patterns, in accordance with a first slot assignment scheme. Each active PLC is assigned slots arranged in a two-dimensional (2-D) rectangular pattern. The size of the rectangular pattern is determined by the number of slots allocated to the PLC. The vertical dimension (or height) of the rectangular pattern is determined by various factors such as the maximum bit rate. The horizontal dimension (or width) of the rectangular pattern is determined by the number of allocated slots and the vertical dimension.

To minimize transmission time, an active PLC may be assigned as many subband groups as possible while conforming to the maximum bit rate. The maximum number of information bits that may be sent in one OFDM symbol may be encoded and modulated with different modes to obtain different numbers of data symbols, which then require different numbers of data subbands for transmission. The maximum number of data subbands that may be used for each PLC may thus be dependent on the mode used for the PLC.

According to an aspect, the rectangular pattern for each active PLC includes contiguous subband groups (in indices) and contiguous symbol periods. This type of assignment reduces the amount of overhead signaling needed to specify the rectangular pattern and further makes the slot assignments for the PLCs more compact, which then simplifies the packing of the PLCs within a frame. The frequency dimension of the rectangular pattern may be specified by the starting subband group and the total number of subband groups for the rectangular pattern. The time dimension of the rectangular pattern may be specified by the starting symbol period and the total number of symbol periods for the rectangular pattern. The rectangular pattern for each PLC may thus be specified with four parameters.

For the example shown in FIG. 7A, PLC 1 is assigned 8 slots in a 2×4 rectangular pattern 712, PLC 2 is assigned 12 slots in a 4×3 rectangular pattern 714, and PLC 3 is assigned 6 slots in a 1×6 rectangular pattern 716. The remaining slots in the frame may be assigned to other active PLCS. As shown in FIG. 7A, different rectangular patterns may be used for different active PLCs. To improve packing efficiency, the active PLCs may be assigned slots in a frame, one PLC at a time and in a sequential order determined by the number of slots allocated to each PLC. For example, slots in the frame may be assigned first to the PLC with the largest number of allocated slots, then to the PLC with the next largest number of allocated slots, and so on, and then finally to the PLC with the smallest number of allocated slots. The slots may also be assigned based on other factors such as, for example, the priority of the PLCs, the relationship between the PLCS, and so on.

Figure 7B:
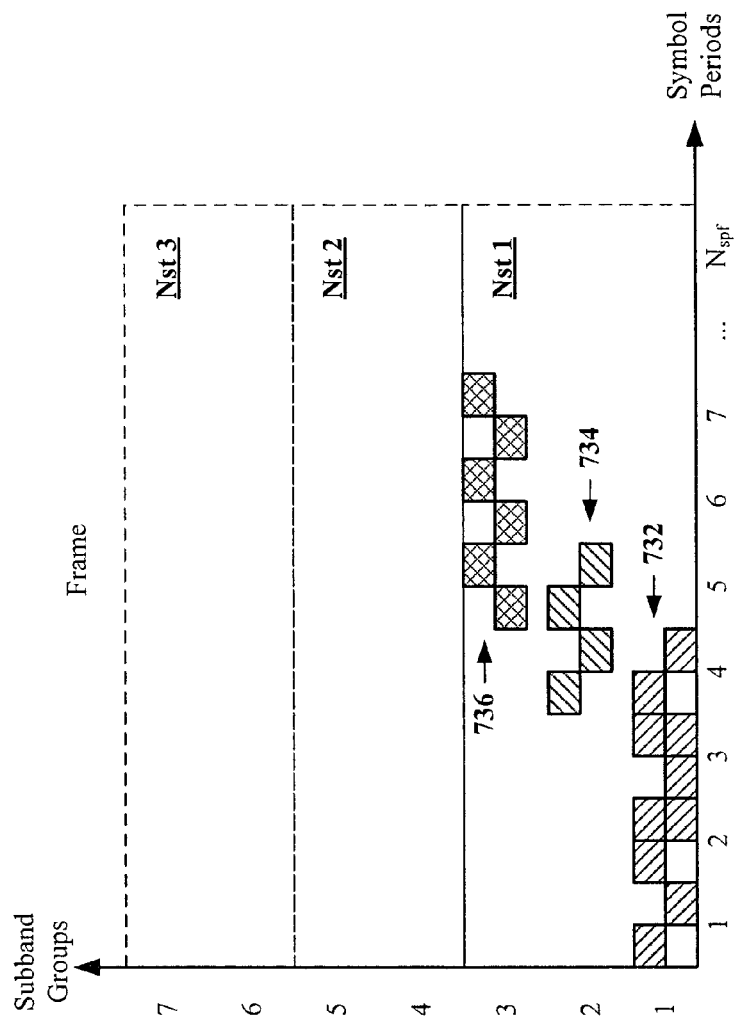
FIG. 7B shows assignment of slots to PLCs in "zigzag" segments.

FIG. 7B shows assignment of slots to PLCs in "sinusoidal" or "zigzag" segments, in accordance with a second slot assignment scheme. For this scheme, a frame is divided into $N_{st}$ "strips," where each strip covers at least one subband group and further spans a contiguous number of symbol periods, up to the maximum number of symbol periods in a frame. The $N_{st}$ strips may include the same or different numbers of subband groups. Each of the active PLCs is mapped to one of the $N_{st}$ strips based on various factors. For example, to minimize transmission time, each active PLC may be mapped to the strip with the most number of subband groups allowed for that PLC.

The active PLCs for each strip are assigned slots in the strip. The slots may be assigned to the PLCs in a specific order, e.g., using a vertical zigzag pattern. This zigzag pattern selects slots from low to high subband group indices, for one symbol period at a time, and from symbol periods 1 to $N_{spf}$. For the example shown in FIG. 7B, strip 1 includes subband groups 1 through 3. PLC 1 is assigned a segment 732 containing 10 slots from subband group 1 in symbol period 1 through subband group 1 in symbol period 4. PLC 2 is assigned a segment 734 containing 4 slots from subband group 2 in symbol period 4 through subband group 2 in symbol period 5. PLC 3 is assigned a segment 736 containing 6 slots from subband group 3 in symbol period 5 through subband group 2 in symbol period 7. The remaining slots in strip 1 may be assigned to other active PLCs mapped to this strip.

The second slot assignment scheme effectively maps all of the slots in a two-dimensional (2-D) strip onto a one-dimensional (1-D) strip and then performs 2-D slot assignment using one dimension. Each active PLC is assigned a segment within the strip. The assigned segment may be specified by two parameters: the start of the segment (which may be given by the starting subband and symbol period) and the length of the segment. An additional parameter is used to indicate the specific strip to which the PLC is mapped. In general, the segment assigned to each active PLC may include any number of slots. However, less overhead signaling is required to identify the assigned segments if the segment sizes are constrained to be in multiple (e.g., 2 or 4) slots.

The second slot assignment scheme can assign slots to active PLCs in a simple manner. Also, tight packing may be achieved for each strip since the slots within the strip may be consecutively assigned to the PLCs. The vertical dimensions of the $N_{st}$ strips may be defined to match the profile of all active PLCs in the superframe so that (1) as many PLCs as possible are sent using the largest number of data subbands allowed for the PLCs and (2) the $N_{st}$ strips are packed as fully as possible.

FIGS. 7A and 7B show two exemplary slot assignment schemes that facilitate efficient packing of PLCs in each frame. These schemes also reduce the amount of overhead signaling needed to indicate the specific slots assigned to each active PLC. Other slot assignment schemes may also be used, as will be appreciated by those skilled in the art, and are intended to fall within the scope of the various aspects described herein. For example, a slot assignment scheme may partition a frame into strips, the active PLCs for the frame may be mapped to the available strips, and the PLCs for each strip may be assigned rectangular patterns within the strip. The strips may have different heights (e.g., different numbers of subband groups). The rectangular patterns assigned to the PLCs for each strip may have the same height as that of the strip but may have different widths (e.g., different number of symbol periods) determined by the number of slots allocated to the PLCs.

For simplicity, FIGS. 7A and 7B show the assignment of slots to individual PLCs. For some services, multiple PLCs may be jointly decoded by wireless devices and are referred to as "joint" PLCs. This may be the case, for example, if multiple PLCs are used for the video and audio components of a single multimedia program and are jointly decoded to recover the program. The joint PLCs may be allocated the same or different number of slots in each superframe, depending on their payloads. To minimize the ON time, the joint PLCs may be assigned slots in consecutive symbol periods so that the wireless devices do not need to "wake up" multiple times within a frame to receive these PLCs.

Figure 7C:
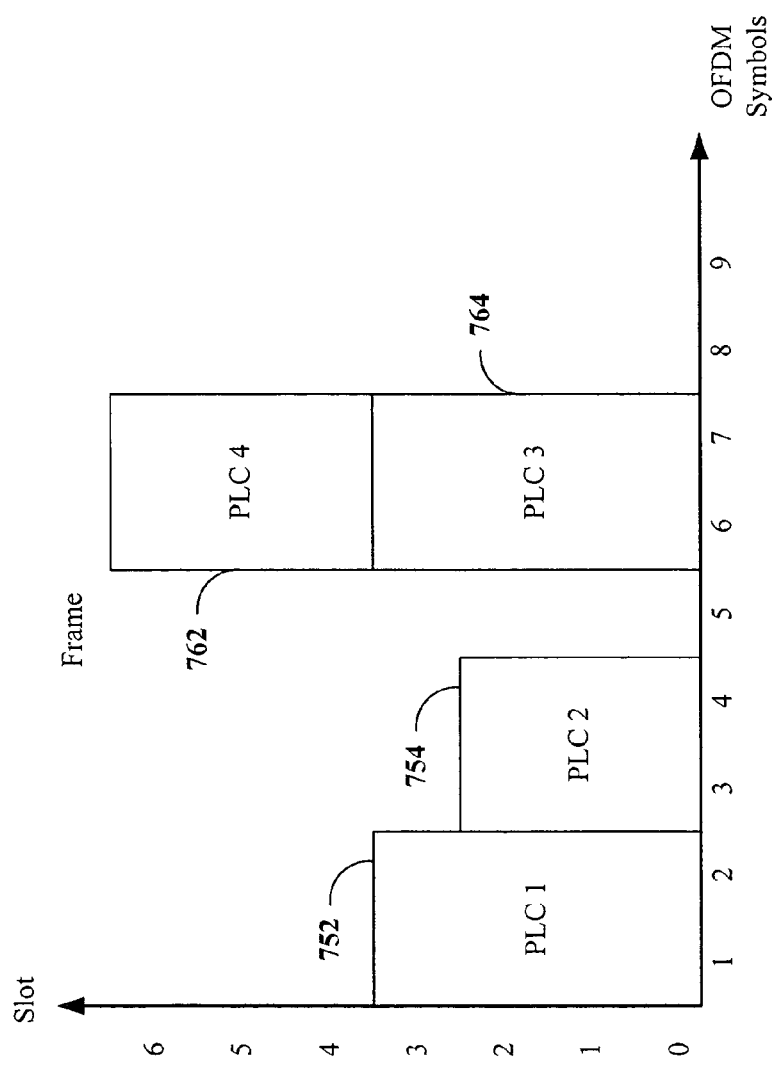
FIG. 7C shows assignment of slots to two joint PLCs in rectangular patterns.

FIG. 7C shows assignment of slots to two joint PLCs 1 and 2 based on the first slot assignment scheme. According to an aspect, the joint PLCs are assigned slots in rectangular patterns that are stacked horizontally or side-by-side. For the example shown in FIG. 7C, PLC 1 is allocated 8 slots in a 2×4 rectangular pattern 752, and PLC 2 is allocated 6 slots in a 2×3 rectangular pattern 754, which is located directly to the right of pattern 752. This embodiment allows each PLC to be decoded as soon as possible, which may reduce buffering requirements at the wireless devices.

According to another aspect, the joint PLCs are assigned slots in rectangular patterns that are stacked vertically. For the example shown in FIG. 7C, PLC 3 is allocated 8 slots in a 2×4 rectangular pattern 762, and PLC 4 is allocated 6 slots in a 2×3 rectangular pattern 764, which is located directly above pattern 762. The total number of subband groups used for the joint PLCs may be such that these joint PLCs collectively conform to the maximum bit rate. If desired, the wireless devices may store the received data symbols for the joint PLCs in separate buffers until they are ready for decoding. This aspect may reduce the ON time for the joint PLCs relative to the first embodiment.

In general, any number of PLCs may be jointly decoded. The rectangular patterns for the joint PLCs may span the same or different numbers of subband groups, which may be constrained by the maximum bit rate. The rectangular patterns may also span the same or different numbers of symbol periods. The rectangular patterns for some sets of joint PLCs may be stacked horizontally while the rectangular patterns for other sets of joint PLCs may be stacked vertically. Joint PLCs may also be assigned zigzag segments. For example, the multiple PLCs to be jointly decoded are assigned consecutive segments in the same strip. According to a related example, the multiple PLCs may be assigned segments in different strips, and the segments may overlap in time as much as possible in order to reduce the ON time to recover these PLCs.

In general, each data stream may be encoded in various manners. For instance, each data stream is encoded with a concatenated code comprised of an outer code and an inner code. The outer code may be a block code such as a Reed-Solomon (RS) code or some other code. The inner code may be a Turbo code (e.g., a parallel concatenated convolutional code (PCCC) or a serially concatenated convolutional code (SCCC)), a convolutional code, a low-density parity-check (LDPC) code, or some other code.

Figure 8:
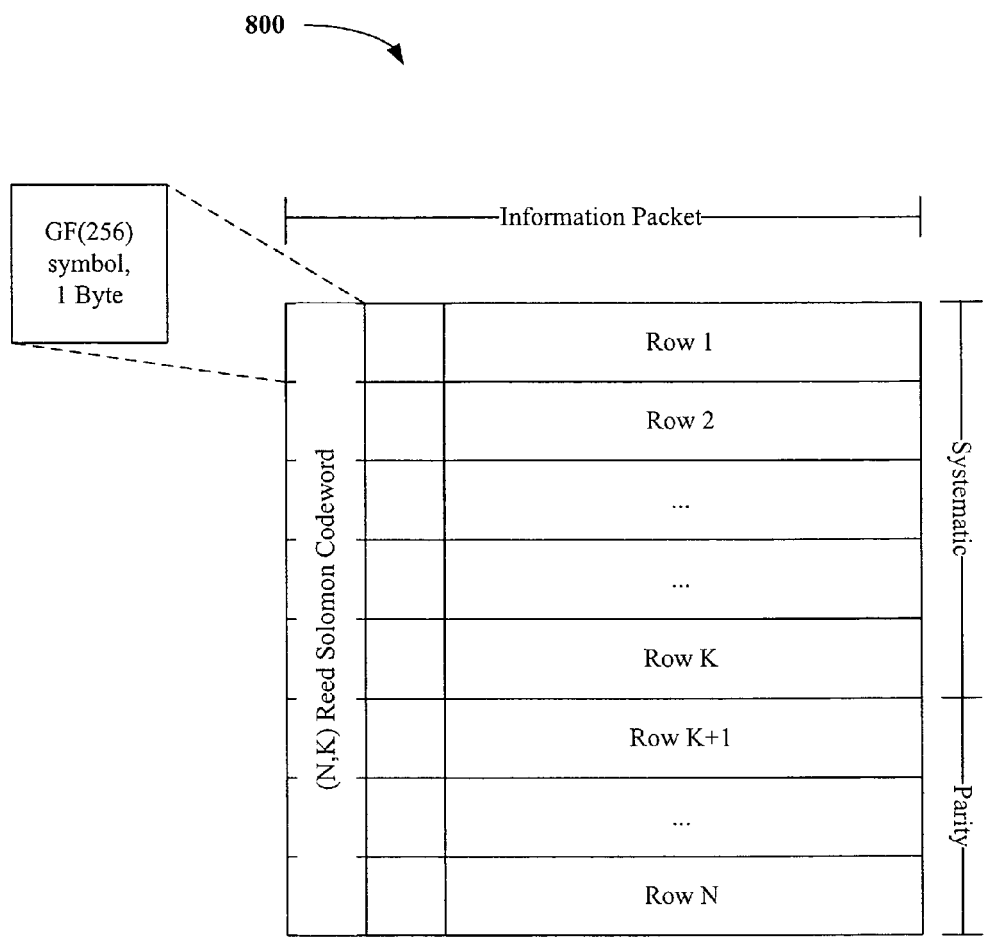
FIG. 8 illustrates coding of a data block with an outer code.

FIG. 8 shows an exemplary outer coding scheme 800 using a Reed-Solomon code. A data stream for a PLC is partitioned into data packets. For example, each data packet may comprise a predetermined number (L) of information bits. As a specific example, each data packet may contain 976 information bits, although other packet sizes and formats may also be used. The data packets for the data stream are written into rows of a memory, one packet per row. After K data packets have been written into K rows, block coding is performed column-wise, one column at a time. For instance, each column contains K bytes (one byte per row) and is encoded with an (N, K) Reed-Solomon code to generate a corresponding codeword that contains N bytes. The first K bytes of the codeword are data bytes (which are also called systematic bytes) and the last N−K bytes are parity bytes (which may be used by a wireless device for error correction). The Reed-Solomon coding generates N−K parity bytes for each codeword, which are written to rows K+1 through N in the memory after the K rows of data. An RS block contains K rows of data and N−K rows of parity. In one aspect, N=16 and K is a configurable parameter, e.g., K∈{12, 14, 16}. The Reed-Solomon code is disabled when K=N. A CRC value, e.g., 16-bits in length, is then appended to each data packet (or row) of the RS block followed by the addition of (e.g., 8) zero (tail) bits to reset the inner encoder to a known state. The resulting longer (e.g., 1000 bits) packet is subsequently encoded by the inner code to generate a corresponding inner coded packet. A code block contains N outer coded packets for the N rows of the RS block, where each outer coded packet may be a data packet or a parity packet. The code block is divided into four subblocks, and each subblock contains four outer coded packets if N=16.

In another aspect, each data stream may be transmitted with or without layered coding, where the term "coding" in this context refers to channel encoding rather than source encoding at a transmitter. A data stream may be comprised of two substreams, which are called a base stream and an enhancement stream. In this respect, the base stream may carry information sent to all wireless devices within the coverage area of the base station. The enhancement stream may carry additional information sent to wireless devices observing better channel conditions. With layered coding, the base stream is encoded and modulated in accordance with a first mode to generate a first modulation symbol stream, and the enhancement stream is encoded and modulated in accordance with a second mode to generate a second modulation symbol stream. The first and second modes may be the same or different. The two modulation symbol streams are then combined to obtain one data symbol stream.

Table 1 shows an exemplary set of eight modes that may be supported by the system. Let m denote the mode, where m=1, 2, . . . , 8. Each mode is associated with a specific modulation scheme (e.g., QPSK or 16-QAM) and a specific inner code rate $R_{in}$ (m) (e.g., ⅓, ½, or ⅔). The first five modes are for "regular" coding with only the base stream, and the last three modes are for layered coding with the base and enhancement streams. For simplicity, the same modulation scheme and inner code rate are used for both the base and enhancement streams for each layered coding mode.

TABLE 1

| Mode m | Modulation Scheme | Inner Code Rate $R_{in}$(m) | Number Slots/ Packet $N_{spp}$(m) | Number Slots/ Subblock $N_{sps}$(m) |
|---|---|---|---|---|
| 1 | QPSK | ⅓ | 3 | 12 |
| 2 | QPSK | ½ | 2 | 8 |
| 3 | 16-QAM | ⅓ | 1.5 | 6 |
| 4 | 16-QAM | ½ | 1 | 4 |
| 5 | 16-QAM | ⅔ | 0.75 | 3 |
| 6 | QPSK/QPSK | ⅓ | 3 | 12 |
| 7 | QPSK/QPSK | ½ | 2 | 8 |
| 8 | QPSK/QPSK | ⅔ | 1.5 | 6 |

Table 1 also shows various transmission parameters for each mode. The fourth column of Table 1 indicates the number of slots needed to transmit one packet for each mode, which assumes a packet size of approximately 1000 information bits and 500 data subbands per slot. The fifth column indicates the number of slots needed to transmit one subblock of four packets for each mode. Different numbers of subband groups may be used for a PLC for all of the modes. The use of more subband groups results in shorter transmission time but also provides less time diversity.

As an example for mode 1, one data block with K data packets may be encoded to generate 16 coded packets. Each data packet contains 1000 information bits. Since mode 1 uses code rate $R_{in}$ (1)=⅓, each coded packet contains 3000 code bits and may be transmitted on 1500 data subbands (or three subband groups) using QPSK, which can carry two code bits per data symbol. The four coded packets for each subblock may be sent in 12 slots. Each subblock may be transmitted in a rectangular pattern of, e.g., dimension 4×3, 3×4, 2×6, or 1×12, where the first value P in dimension P×Q is for the number of subband groups and the second value Q is for the number of symbol periods for the rectangular pattern.

Table 1 shows an exemplary design, which is provided to show various parameters that may impact subband allocation and assignment. In general, the system may support any number of modes, and each mode may correspond to a different coding and modulation scheme. For example, each mode may correspond to a different combination of modulation scheme and inner code rate. To simplify the design of the wireless devices, the system may utilize a single inner code (e.g., with a base code rate of ⅓ or ⅕), and different code rates may be achieved by puncturing or deleting some of the code bits generated by the inner code. However, the system may also utilize multiple inner codes. The maximum allowable number of subband groups for each mode may be different and possibly based on the maximum bit rate.

Generally, one or multiple data blocks may be sent on an active PLC in each superframe. The number of data blocks to be sent per superframe is dependent on the data rate of the data stream being sent on the PLC. The number of slots ($N_{slot}$) to allocate to the PLC per frame is equal to the number of data blocks ($N_{bl}$) being sent on the PLC in the superframe times the number of slots required for one subblock, or $N_{slot} = N_{bl} \cdot N_{sps}(m)$, where $N_{sps}(m)$ is dependent on the mode used for the PLC. If the PLC carries a large number of data blocks in one superframe (for a high-rate data stream), then it is desirable to use as many subband groups as possible in order to minimize the transmission time for the PLC. For example, if the PLC carries 16 data blocks in one superframe, then the transmission time per frame using mode 1 is 192=16·12 symbol periods using one subband group (which is 65% of the frame duration) and only 48=192/4 symbol periods using four subband groups (which is 16.25% of the frame duration). The transmission time for the PLC may thus be substantially shortened by using more subband groups.

Figure 9A:
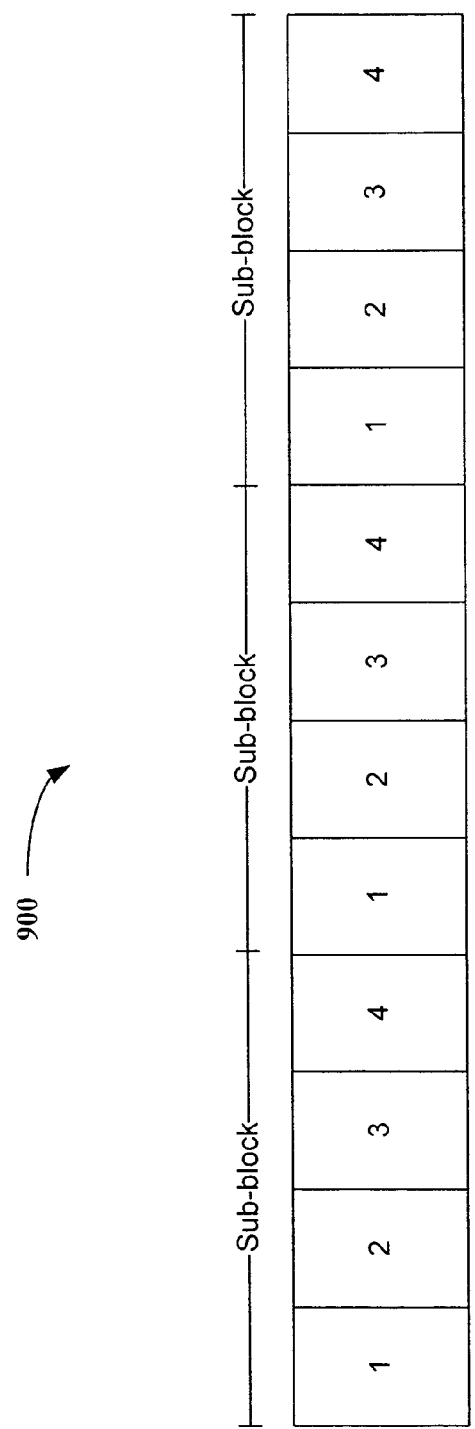
FIGS. 9A and 9B show assignment of slots for one data block using one subband group and a maximum allowable number of subband groups, respectively.

FIG. 9A shows assignment of slots in a superframe for one code block ($N_{bl}=1$) using one subband group, which is equivalent to assignment of slots in a frame for one subblock. For the aspect described above, each subblock contains four packets that are labeled 1, 2, 3, and 4 in FIG. 9A. Each packet is transmitted in a different number of slots for each of modes 1 through 5 in Table 1. The four packets 1 through 4 for one subblock may be transmitted on one subband group in 12 symbol periods for mode 1, 8 symbol periods for mode 2, 6 symbol periods for mode 3, 4 symbol periods for mode 4, and 3 symbol periods for mode 5. For modes 3 and 5, two packets may share the same slot. Each packet may be decoded as soon as the entire packet is received.

Figure 9B:
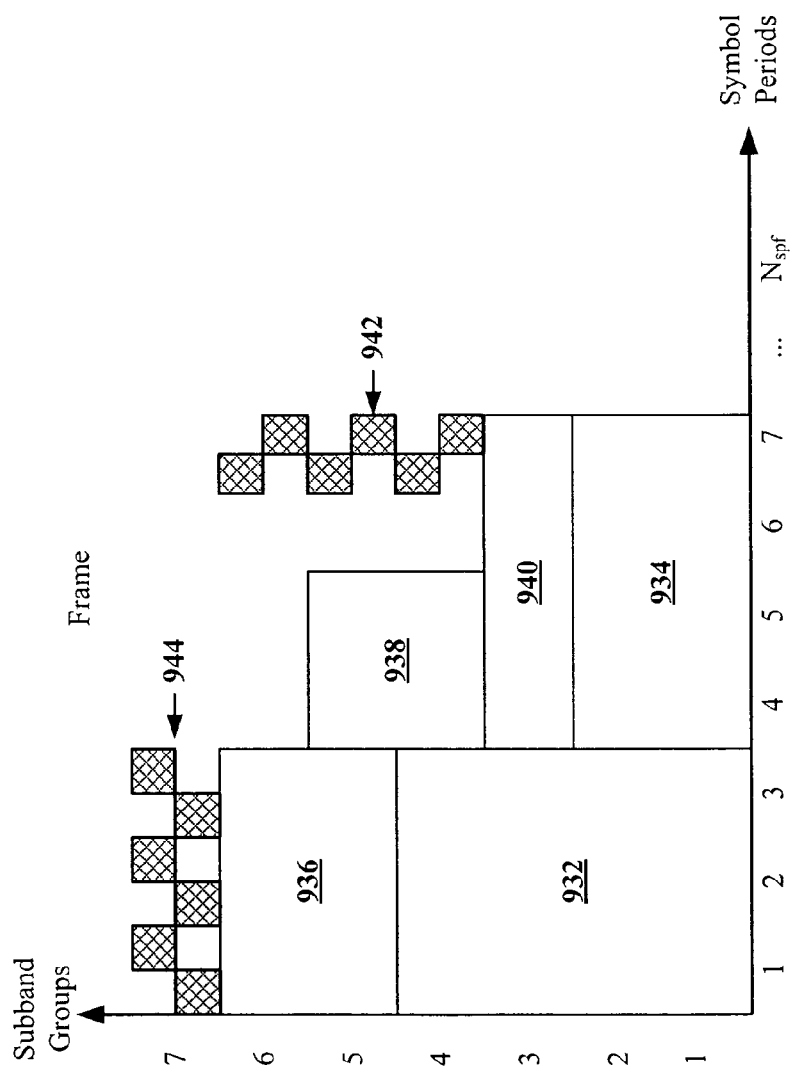

FIG. 9B shows assignment of slots in a superframe for one code block ($N_{bl}=1$) using 4, 4, 3, 2, and 1 subband group for modes m=1, 2, 3, 4, and 5, respectively. The four packets in one subblock may be sent in a 4×3 rectangular pattern 932 for mode 1, a 4×2 rectangular pattern 934 for mode 2, a 3×2 rectangular pattern 936 for mode 3, a 2×2 rectangular pattern 938 for mode 4, and a 1×4 rectangular pattern 940 for mode 5.

According to an example, the four packets in one subblock are transmitted in a vertical zigzag pattern 942 within a rectangular pattern, as shown in FIG. 9B. This aspect reduces buffering requirements since each packet is transmitted in as few symbol periods as possible and there is only one partial packet in any given symbol period. In another example, the four packets are transmitted in a horizontal zigzag pattern 944. This aspect provides more time diversity since each packet is transmitted over as many symbol periods as possible. However, the maximum bit rate may restrict the number of subband groups that may be used, or additional buffering may be needed, since up to two packets may be received in full in the same symbol period using the horizontal zigzag pattern.

Figure 9C:
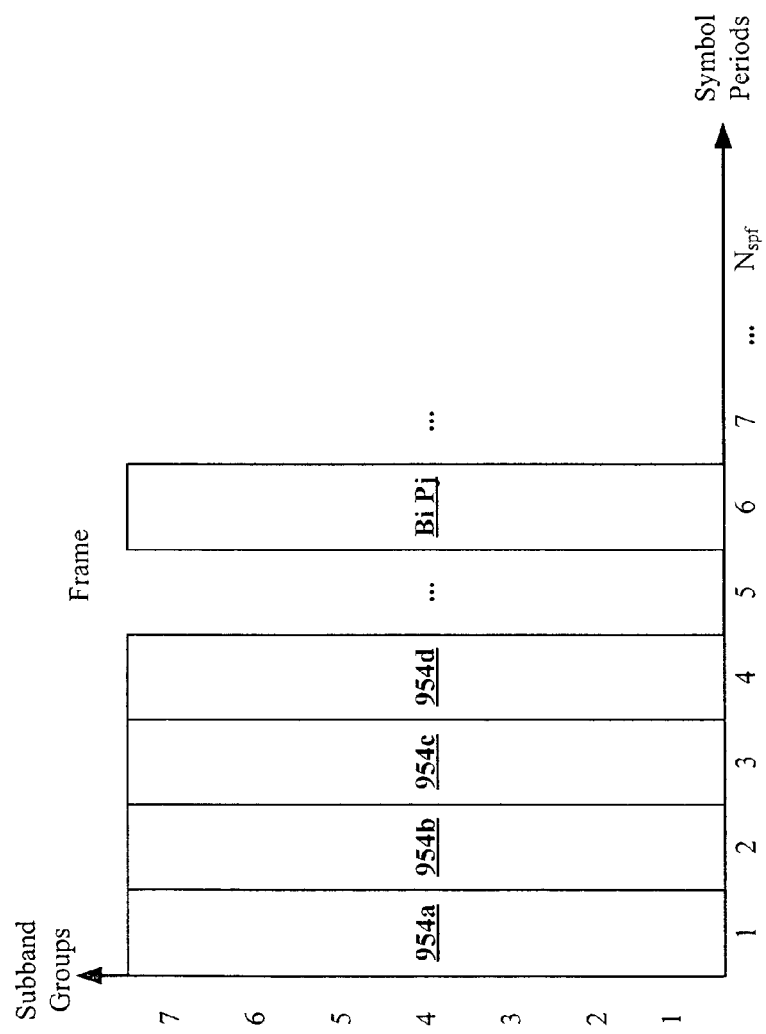
FIG. 9C shows assignment of slots for six data blocks.

FIG. 9C shows assignment of slots in a superframe for six code blocks ($N_{bl}=6$) using four subband groups. In this example, mode 2 is used for the PLC, each packet is sent in two slots, 24 packets are sent in each frame for the six code blocks, and the PLC is allocated 48 slots in a 4×12 rectangular pattern 952 for each frame. The 24 packets may be sent in various manners within rectangular pattern 952.

In a first example, which is shown in FIG. 9C, the packets are sent in the rectangular pattern by cycling through the six code blocks. For each cycle through the six code blocks, one packet is selected from each code block, and the six packets for the six code blocks are sent using the vertical zigzag pattern. The six packets 1 for the code blocks are sent in a box 954a, the six packets 2 for the code blocks are sent in a box 954b, the six packets 3 for the code blocks are sent in a box 954c, and the six packets 4 for the code blocks are sent in a box 954d. The j-th packet for the i-th code block is labeled as Bi Pj in FIG. 9C.

This aspect provides more time diversity across each code block since the four packets for the code block are sent over more symbol periods. Packets sent in one symbol period are likely to suffer from correlated erasures. For example, a deep fade during a symbol period may cause all packets sent in that symbol period to be decoded in error. By sending packets from different code blocks in the same symbol period, the correlated (packet) erasures will be distributed over multiple code blocks. This enhances the ability of the block decoder to correct these erasures. The first embodiment also spaces the four packets for each code block as far apart in time as possible, which improves time diversity across the code block. For example, the four packets for code block 1 are sent in symbol periods 1, 4, 7, and 10, and are spaced apart by three symbol periods. This aspect also reduces buffering requirements since each packet is sent over as few symbol periods as possible.

In a second example, which is not shown in the figures, the packets are selected by cycling through the $N_{bl}$ code blocks, similar to the first embodiment, but the $N_{bl}$ packets for each cycle are sent using the horizontal zigzag pattern within box 954. This aspect may provide more time diversity across each packet. In a third example, the four packets for one code block are sent first, the four packets for another code block are sent next, and so on. This aspect allows for early recovery of some code blocks. Multiple code blocks may thus be sent on a PLC in various manners. As noted above, multiple PLCs may be intended to be jointly decoded. Each of the joint PLCs may carry any number of code blocks per superframe depending on the data rate of the data stream being sent on the PLC. The total number of subband groups to use for the joint PLCs may be limited by the maximum bit rate.

Figure 9D:
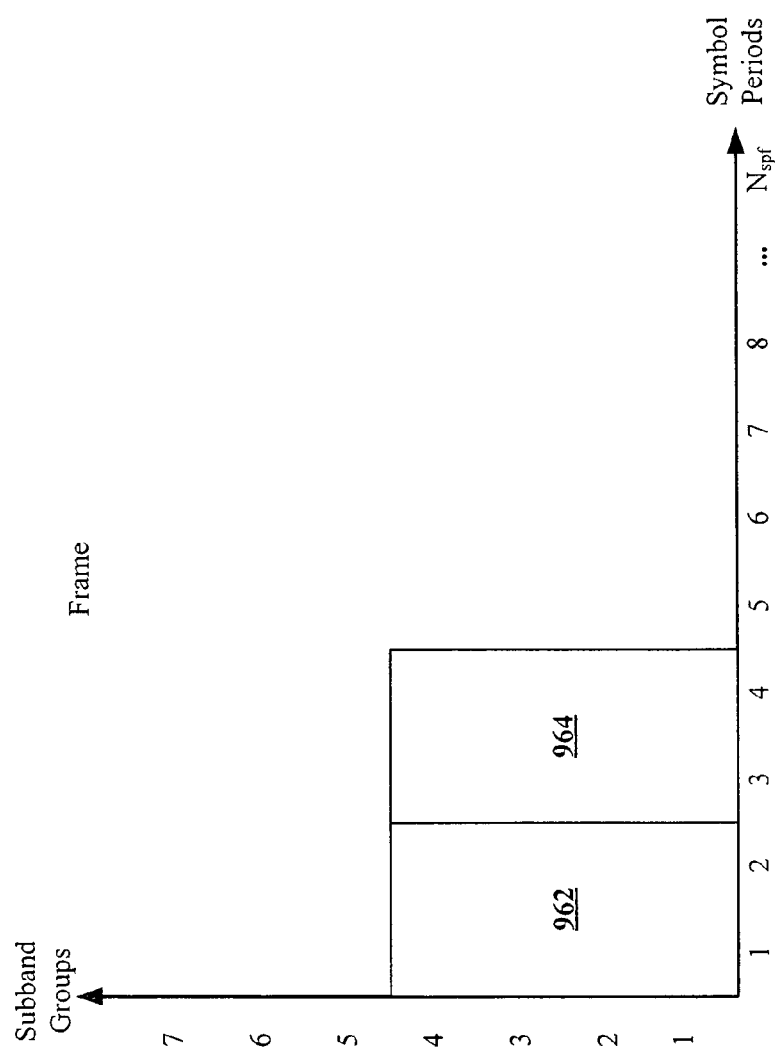
FIGS. 9D and 9E show assignment of slots to two joint PLCs with rectangular patterns stacked horizontally and vertically, respectively.

FIG. 9D shows assignment of slots in a superframe to two joint PLCs using horizontally stacked rectangular patterns. In this example, PLC 1 carries two code blocks using mode 4 (e.g., for a video stream), and eight packets are sent in eight slots for each frame. PLC 2 carries one code block using mode 2 (e.g., for an audio stream), and four packets are sent in eight slots for each frame. The eight packets for PLC 1 are sent in a 2×4 rectangular pattern 962 by cycling through the two code blocks and using the vertical zigzag pattern, as described above for FIG. 9C. The four packets for PLC 2 are sent in a 2×4 rectangular pattern 964 using the vertical zigzag pattern. Pattern 964 is stacked to the right of pattern 962.

Figure 9E:
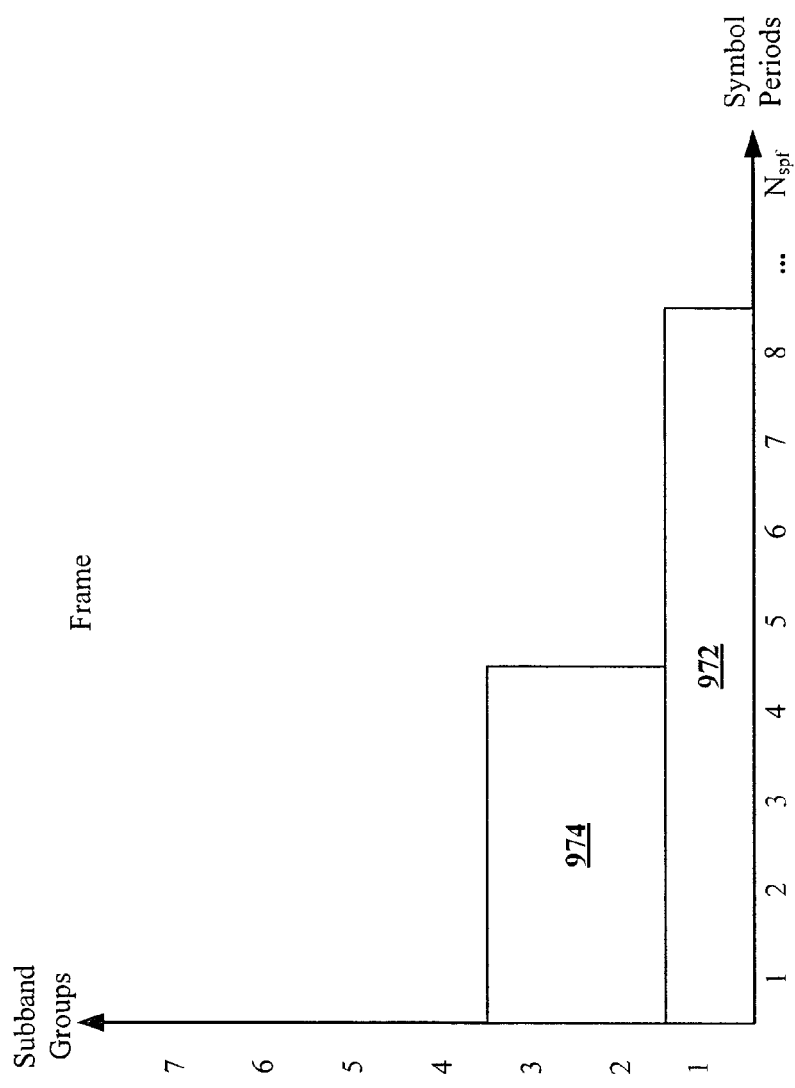

FIG. 9E shows assignment of slots in a superframe to two joint PLCs using vertically stacked rectangular patterns. The eight packets for PLC 1 are sent in a 1×8 rectangular pattern 972 by cycling through the two code blocks and using the vertical zigzag pattern, albeit with only one subband group. The four packets for PLC 2 are sent in a 2×4 rectangular pattern 974 using the vertical zigzag pattern. Pattern 974 is stacked on top of pattern 972. The use of the 1×8 rectangular pattern for PLC 1 ensures that only two packets are sent in each symbol period, which may be a restriction imposed by the maximum bit rate. A 2×4 rectangular pattern may be used for PLC 1, if allowed by the maximum bit rate, to reduce the total transmission time for both PLCs 1 and 2.

The examples shown in FIGS. 9D and 9E may be extended to cover any number of joint PLCs, any number of code blocks for each PLC, and any mode for each PLC. Slots may be assigned to the joint PLCs such that the total transmission time for these PLCs is minimized while conforming to the maximum bit rate.

For the outer coding scheme shown in FIG. 8, the first K packets of each code block are for data, and the last N–K packets are for parity bits. Since each packet includes a CRC value, a wireless device can determine whether each packet is decoded correctly or in error by re-computing the CRC value using the received information bits of the packet and comparing the recomputed CRC value to the received CRC value. For each code block, if the first K packets are decoded correctly, then the wireless device does not need to process the last N–K packets. For example, if N=16, K=12, and the last four packets of a code block are sent in the fourth frame, then the wireless device does not need to wake up in the last frame if the 12 data packets sent in the first three frames are decoded correctly. Furthermore, any combination of up to N–K incorrectly (inner) decoded packets may be corrected by the Reed-Solomon decoder.

For clarity, the description above is based on a concatenated coding scheme comprised of an outer code and an inner code and for the parameters given in Table 1. Other coding schemes may also be used for the system. Furthermore, the same or different parameters may be used for the system. The subband allocation and assignment may be performed using the techniques described herein and in accordance with the specific coding scheme and parameters applicable to the system.

Figure 10:
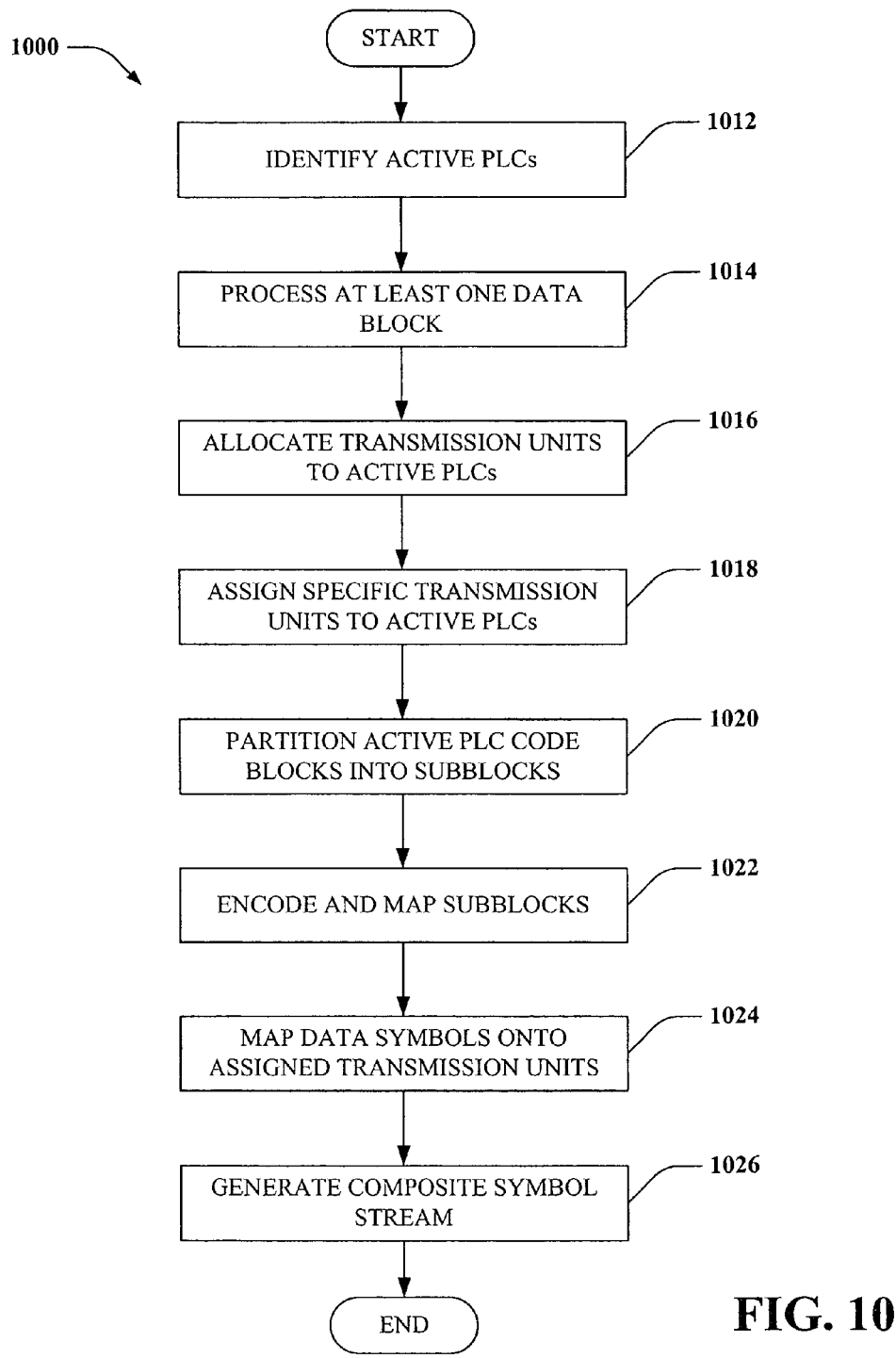
FIG. 10 shows a process for broadcasting multiple data streams.

FIG. 10 shows a flow diagram of a process 1000 for broadcasting multiple data streams using the multiplexing and transmission techniques described herein. Process 1000 may be performed for each superframe. Initially, the active PLCs for the current superframe are identified, at 1012. For each active PLC, at least one data block is processed in accordance with the outer code (and rate) selected for the PLC to obtain at least one code block, one code block for each data block, at 1014. Each active PLC is allocated a specific number of transmission units based on the PLC's payload for the current superframe, at 1016. In general, the transmission units in the current superframe may be allocated to the active PLCs with any level of granularity. For example, the transmission units may be allocated to the active PLCs in slots, with each slot containing 500 transmission units. Specific transmission units in each frame of the current superframe are then assigned to each active PLC, at 1018. Additionally, at 1016, a determination can be made regarding the resource quantity allocated for each active PLC. 1018 provides the specific resource allocation for each active PLC and may be performed based on an assignment scheme. For example, the scheme that assigns rectangular patterns or the scheme that assign zigzag segments within strips may be utilized, at 1018.

The allocation and assignment of transmission units may also be performed jointly since the allocation may be dependent on the packing efficiency achieved by the assignment.

Each code block for each active PLC is partitioned into multiple subblocks, one subblock for each frame, at 1020. Each packet in each subblock is then encoded by the inner code and mapped to modulation symbols, at 1022. The inner code rate and modulation scheme used for each PLC is determined by the mode selected for that PLC. The multiple subblocks for each code block are then sent in the multiple frames of the current superframe to achieve time diversity. For each frame of the current superframe, the data symbols in the subblock(s) to be sent in that frame for each active PLC are mapped onto the transmission units assigned to the PLC, at 1024. A composite symbol stream is then formed with (1) the multiplexed data symbols for all of the active PLCs and (2) pilot, overhead, and guard symbols, at 1026. The composite symbol stream is further processed (e.g., OFDM modulated and conditioned) and broadcast to wireless devices in the system.

The multiplexing and transmission techniques described herein allow the multiple data streams sent in each superframe to be independently recoverable by a wireless device. A given data stream of interest may be recovered by (1) performing OFDM demodulation on all subbands or just the subbands used for the data stream, (2) demultiplexing the detected data symbols for the data stream, and (3) decoding the detected data symbols for the data stream. The other data streams need not be completely or partially decoded in order to receive the desired data stream. Depending on the allocation and assignment scheme selected for use, the wireless device may perform partial demodulation and/or partial decoding of another data stream in order to recover the data stream of interest. For example, if multiple data streams share the same OFDM symbol, then the demodulation of a selected data stream may result in partial demodulation of an unselected data stream.

Figure 11:
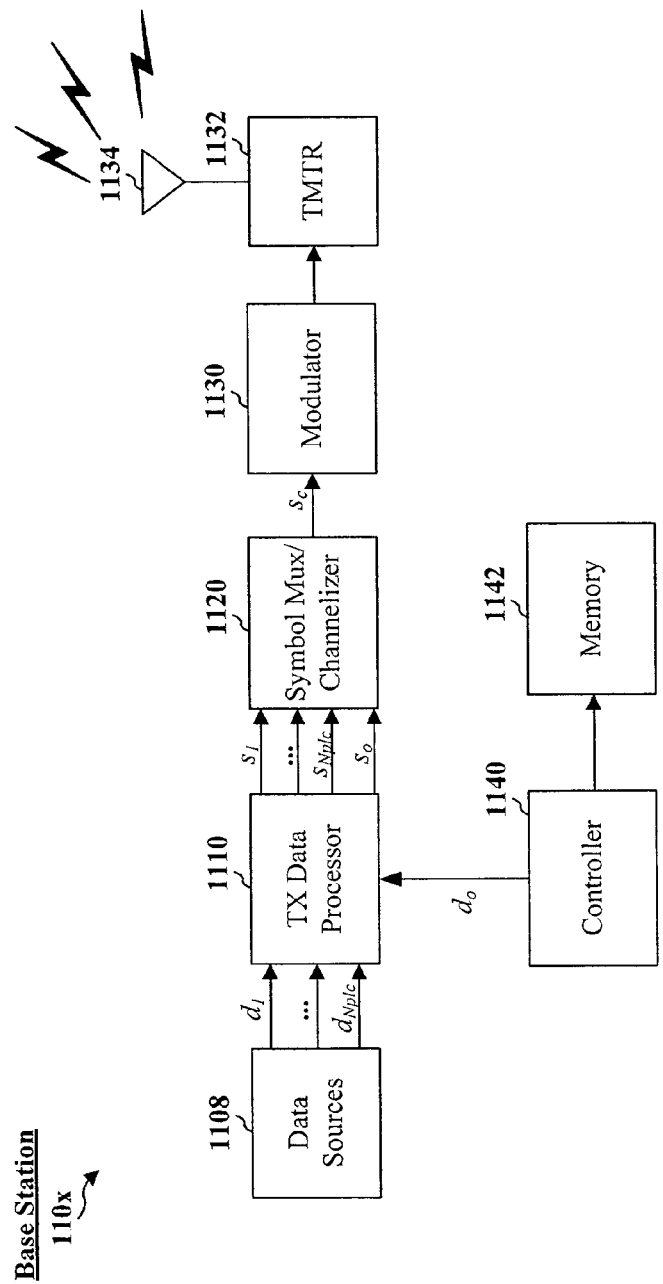
FIG. 11 shows a block diagram of a base station.

FIG. 11 shows a block diagram of a base station 110*x*, which may be one of the base stations in system 100. At base station 110*x*, a transmit (TX) data processor 1110 receives multiple ($N_{plc}$) data streams (denoted as $\{d_1\}$ through $\{d_{N_{plc}}\}$) from one or more data sources 1108, such as multiple data sources for different services, where each service may be carried in one or more PLCs. TX data processor 1110 processes each data stream in accordance with the mode selected for that stream to generate a corresponding data symbol stream and provides $N_{plc}$ data symbol streams (denoted as $\{s_1\}$ through $\{S_{N_{plc}}\}$) to a symbol multiplexer (Mux)/channelizer 1120. TX data processor 1110 also receives overhead data (which is denoted as $\{d_O\}$) from a controller 1140, processes the overhead data in accordance with the mode used for overhead data, and provides an overhead symbol stream (denoted as $\{s_O\}$) to channelizer 1120. An overhead symbol is a modulation symbol for overhead data.

Channelizer 1120 multiplexes the data symbols in the $N_{plc}$ data symbol streams onto their assigned transmission units, and provides pilot symbols on the pilot subbands and guard symbols on the guard subbands. Channelizer 1120 further multiplexes pilot symbols and overhead symbols in the pilot and overhead section preceding each superframe (see FIG. 2). Channelizer 1120 provides a composite symbol stream (denoted as $\{s_C\}$) that carries data, overhead, pilot, and guard symbols on the proper subbands and symbol periods. An OFDM modulator 1130 performs OFDM modulation on the composite symbol stream and provides a stream of OFDM symbols to a transmitter unit (TMTR) 1132. Transmitter unit 1132 conditions (e.g., converts to analog, filters, amplifies, and frequency upconverts) the OFDM symbol stream and generates a modulated signal that then is transmitted from an antenna 1134.

Figure 12:
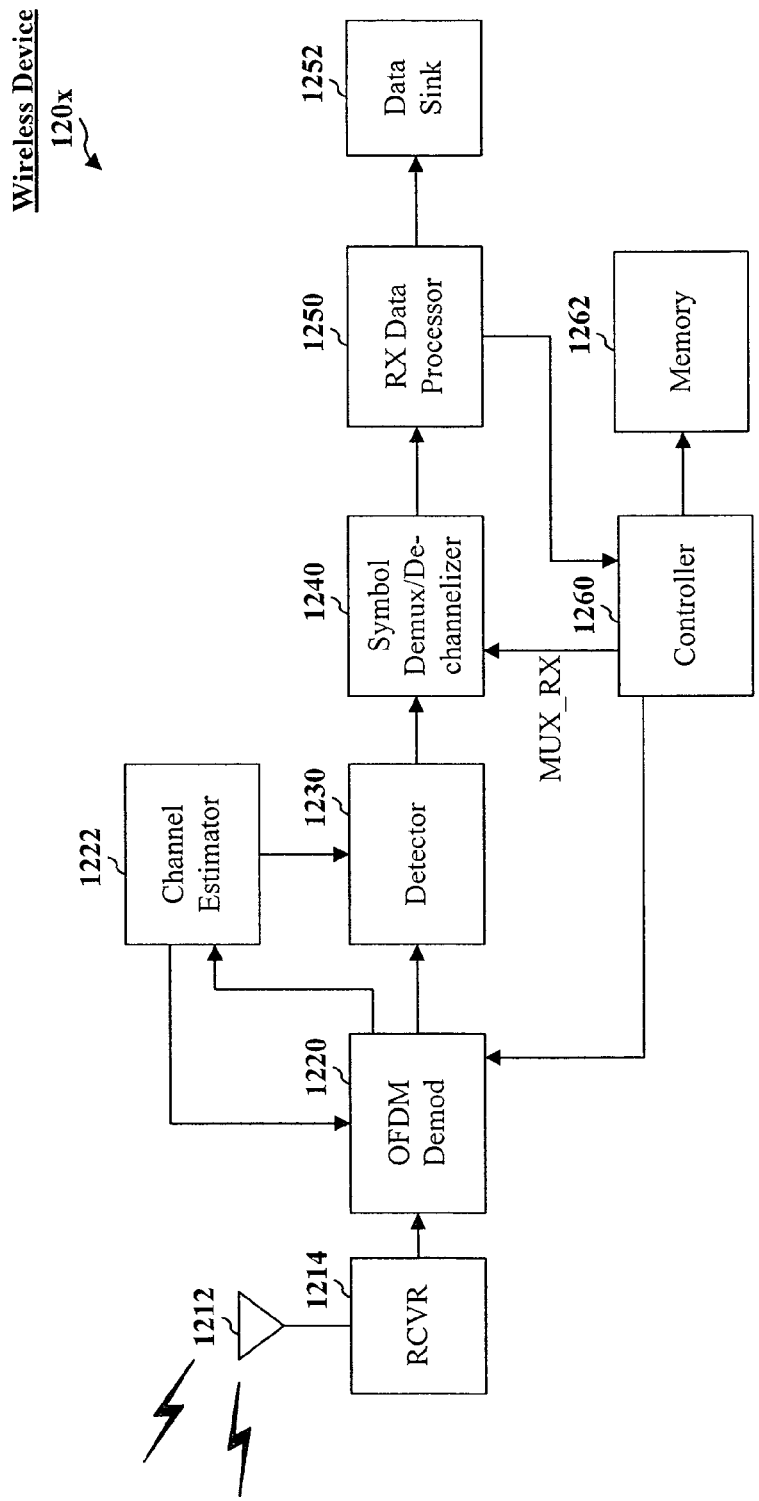
FIG. 12 shows a block diagram of a wireless device.

FIG. 12 shows a block diagram of a wireless device 120x, which may be one of the wireless devices in system 100. At wireless device 120x, an antenna 1212 receives the modulated signal transmitted by base station 110x and provides a received signal to a receiver unit (RCVR) 1214. Receiver unit 1214 conditions, digitizes, and processes the received signal and provides a sample stream to an OFDM demodulator 1220. OFDM demodulator 1220 performs OFDM demodulation on the sample stream and provides (1) received pilot symbols to a channel estimator 1222, and (2) received data symbols and received overhead symbols to a detector 1230. Channel estimator 1222 derives a channel response estimate for the radio link between base station 110x and wireless device 120x based on the received pilot symbols. Detector 1230 performs detection (e.g., equalization or matched filtering) on the received data and overhead symbols with the channel response estimate. Detector 1230 provides to a symbol demultiplexer (Demux)/dechannelizer 1240 "detected" data and overhead symbols, which are estimates of the transmitted data and overhead symbols, respectively. The detected data/overhead symbols may be represented by log-likelihood ratios (LLRs) for the code bits used to form the data/overhead symbols, or by other representations. Channel estimator 1222 may also provide timing and frequency information to OFDM demodulator 1220.

A controller 1260 obtains an indication of (e.g., user selection for) one or more specific data streams/PLCs to be recovered. Controller 1260 then determines the resource allocation and assignment for each selected PLC. If wireless device 120x is acquiring the signal for the first time (e.g., initial acquisition), then the signaling information is obtained from the overhead OFDM symbols decoded by a receive (RX) data processor 1250. If wireless device 120x is successfully receiving data blocks in superframes, then the signaling information may be obtained through the embedded overhead signaling that is part of at least one data block sent in each superframe. This embedded overhead signaling indicates the allocation and assignment of the corresponding data stream/PLC in the next superframe. Controller 1260 provides a MUX_RX control to dechannelizer 1240. Dechannelizer 1240 performs demultiplexing of the detected data or overhead symbols for each symbol period based on the MUX_RX control and provides one or more detected data symbol streams or a detected overhead symbol stream, respectively, to RX data processor 1250. In the case of the overhead OFDM symbols, RX data processor 1250 processes the detected overhead symbol stream in accordance with the mode used for overhead signaling and provides the decoded overhead signaling to controller 1260. For the data symbol stream(s), RX data processor 1250 processes each detected data symbol stream of interest, in accordance with the mode used for that stream, and provides a corresponding decoded data stream to a data sink 1252. In general, the processing at wireless device 120x is complementary to the processing at base station 110x.

Controllers 1140 and 1260 direct the operation at base station 110x and wireless device 120x, respectively. Memory units 1142 and 1262 provide storage for program codes and data used by controllers 1140 and 1260, respectively. Controller 1140 and/or a scheduler 1144 allocate resources to the active PLCs and further assign transmission units to each active PLC.

Figure 13:
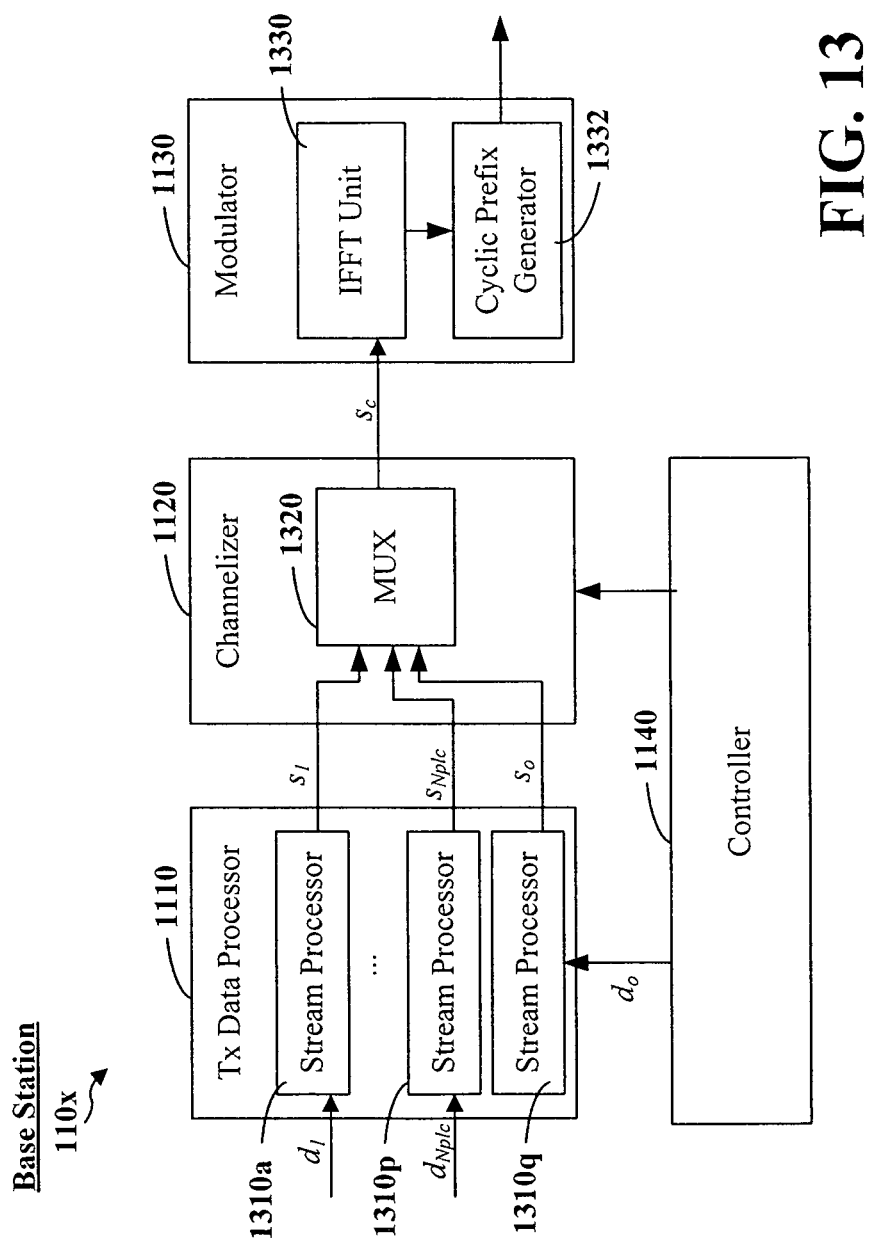
FIG. 13 shows a block diagram of a transmit (TX) data processor, a channelizer, and an OFDM modulator at the base station.

FIG. 13 shows a block diagram of the TX data processor 1110, channelizer 1120, and OFDM modulator 1130 at base station 110x. TX data processor 1110 includes $N_{plc}$ TX data stream processors 1310a and 1310p for the $N_{plc}$ data streams and a data stream processor 1310q for the overhead data. Each TX data stream processor 1310 independently encodes, interleaves, and modulates a respective data stream $\{d_i\}$ to generate a corresponding data symbol stream $\{s_i\}$.

Channelizer 1120 is implemented with a multiplexer 1320 that receives the $N_{plc}$ data symbol streams, the overhead symbol stream, pilot symbols, and guard symbols. Multiplexer 1320 provides the data symbols, overhead symbols, pilot symbols, and guard symbols onto the proper subbands and symbol periods based on a MUX_TX control from controller 1140 and outputs the composite symbol stream, $\{s_C\}$. In assigning modulation symbols to the subband groups, a further level of (symbol) interleaving can be performed by assigning modulation symbols in a pseudo-random fashion to the subbands within each subband group. To simplify the assignment of subbands, the PLCs may be assigned slots, as described above. The slots may then be mapped to different subband groups, e.g., in a pseudo-random fashion from one symbol period to the next. This slot to subband group mapping ensures that the modulation symbols associated with a specific slot index have different distances from the pilot subbands for different symbol periods, which may improve performance.

OFDM modulator 1130 includes an inverse fast Fourier transform (IFFT) unit 1330 and a cyclic prefix generator 1332. For each symbol period, IFFT unit 1330 transforms each set of $N_{tsb}$ symbols for the $N_{tsb}$ total subbands to the time domain with an $N_{tsb}$-point IFFT to obtain a "transformed" symbol that contains $N_{tsb}$ time-domain chips. To combat intersymbol interference (ISI), which is caused by frequency selective fading, cyclic prefix generator 1332 repeats a portion of each transformed symbol to form a corresponding OFDM symbol. The repeated portion is often called a cyclic prefix or guard interval. Cyclic prefix generator 1332 provides a stream of data chips (denoted as $\{c\}$) for the composite symbol stream, $\{s_C\}$.

Figure 14:
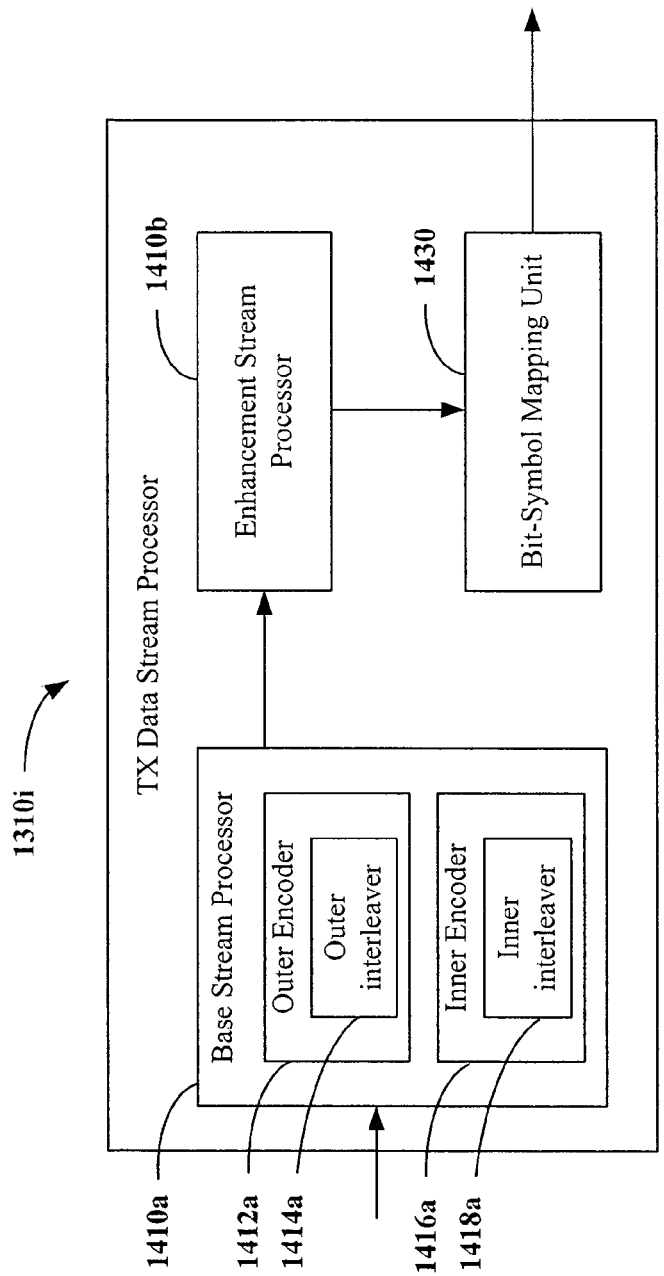
FIG. 14 shows a block diagram of a data stream processor for one data stream.

FIG. 14 shows a block diagram of a TX data stream processor 1310i, which may be used for each of TX data stream processors 1310 in FIG. 13. TX data stream processor 1310i processes one data stream for one PLC. Data stream processor 1310i includes a base stream processor 1410a, an enhancement stream processor 1410b, and a bit-to-symbol mapping unit 1430. Processor 1410a processes a base stream for the PLC, and processor 1410b processes an enhancement stream (if any) for the PLC.

Within base stream processor 1410a, an outer encoder 1412a encodes each data block of base stream data in accordance with, e.g., a Reed-Solomon code to generate an RS code block. An RS code block consists of N outer coded packets. Encoder 1412a also appends a CRC value to each outer coded packet. This CRC value may be used by a wireless device for error detection (e.g., to determine whether the packet is decoded correctly or in error). An outer interleaver 1414a partitions each code block into subblocks, interleaves (e.g., reorders) the packets among the different subblocks that are transmitted in each frame, and buffers the subblocks transmitted in the different frames of a superframe. An inner encoder 1416a then encodes each outer coded packet of a subblock in accordance with, e.g., a Turbo code to generate an inner coded packet. An inner bit interleaver 1418a interleaves the bits within each inner coded packet to generate a corresponding interleaved packet. The encoding by the outer encoder 1412a and inner encoder 1416a increases the reliability of the transmission for the base stream. The interleaving by outer interleaver 1414a and inner interleaver 1418a provides time and frequency diversity, respectively, for the base stream transmission. A scrambler 1420a randomizes the bits in each encoded and bit interleaved packet with a PN sequence and provides scrambled bits to mapping unit 1430.

Enhancement stream processor 1410b similarly performs processing on the enhancement stream (if any) for the PLC. Processor 1410b may use the same inner code, outer code, and modulation scheme as those used for processor 1410a, or different ones. Processor 1410b provides scrambled bits for the enhancement stream to mapping unit 1430.

Mapping unit 1430 receives the scrambled bits for the base and enhancement streams, a gain $G_{bs}$ for the base stream, and a gain $G_{es}$ for the enhancement stream. The gains $G_{bs}$ and $G_{es}$ determine the amount of transmit power to use for the base and enhancement streams, respectively. Different coverage areas may be achieved for the base and enhancement streams by transmitting these streams at different power levels. Mapping unit 1430 maps the received scrambled bits to data symbols based on a selected mapping scheme and the gains $G_{bs}$ and $G_{es}$. The symbol mapping may be achieved by (1) grouping sets of B scrambled bits to form B-bit binary values, where B≥1, and (2) mapping each B-bit binary value to a data symbol, which is a complex value for a point in a signal constellation for the selected modulation scheme. If layered coding is not used, then each data symbol corresponds to a point in a signal constellation such as M-PSK or M-QAM, where $M=2^B$. If layered coding is used, then each data symbol corresponds to a point in a complex signal constellation, which may or may not be formed by the superposition of two scaled signal constellations. For the embodiment described above, the base and enhancement streams carry the same number of code blocks for each superframe. The code blocks for the base and enhancement streams may be transmitted simultaneously, as shown in FIG. 14, or transmitted using TDM and/or FDM.

Figure 15:
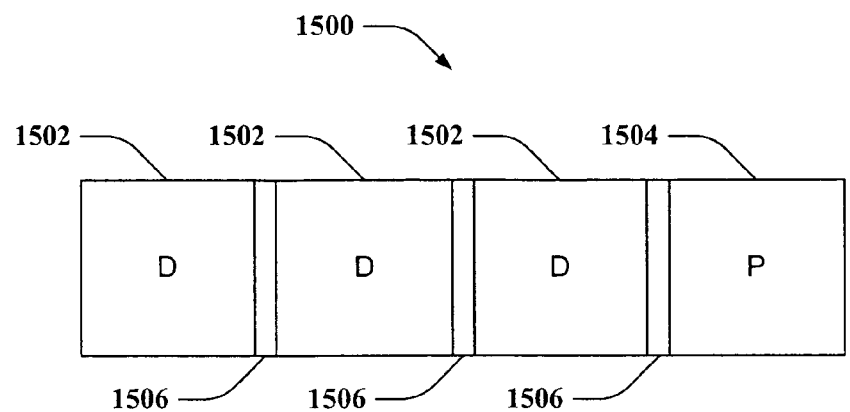
FIGS. 15 and 16 illustrate portions of a transmission superframe comprising data packets and associated parity packets.
Figure 16:
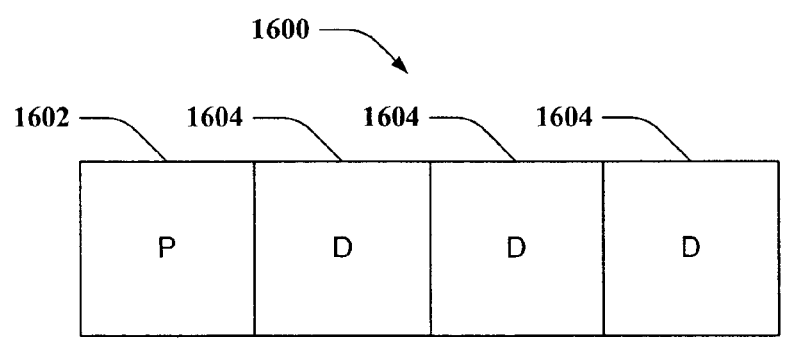

FIGS. 15 and 16 illustrate portions of a data transmission, such as a portion of a superframe, that comprise data packet portions and parity portions, in accordance with various aspects described herein. Regarding FIG. 15, a transmission portion 1500 comprises three data segments 1502 and a trailing parity segment 1504. It will be appreciated that more or fewer data segments may be utilized per parity segment, and that FIG. 15 is intended to illustrate that the parity segment is positioned at a trailing relative to a plurality of data segments associated therewith. Data segments 1502 can comprise CRC segments 1506 to permit a receiver to validate each data segment (e.g., perform error detection, . . . ). According to an example, a receiver, such as receiver 1214, can receive and decode data segments 1502 and verify that each segment 1502 is correct by utilizing respective CRC segments 1506. For instance, if the receiver does not detect an error in any of the data segments 1502, then the receiver may conserve power by refusing to decode parity segment 1504.

Now referring to a similar example, FIG. 16 illustrates a transmission portion 1600 comprising a parity segment 1602 that is followed by three data segments 1604, although more or fewer data segments 1604 may be associated with parity segment 1602. According to this example, parity segment 1602 may be decoded prior to data segment 1604 decoding, which can facilitate reducing latency in a receiver, such as receiver 1214 because the data segments are pre-validated (e.g., CRC segments need not be evaluated for each data segment 1604).

Figure 17:
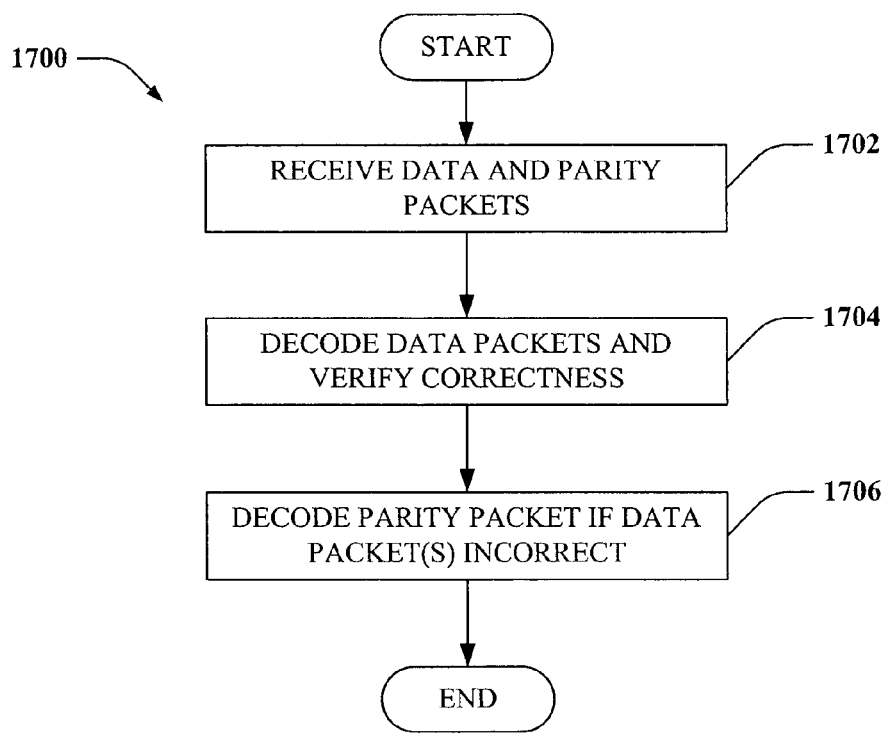
FIG. 17 illustrates a method for conserving power in a wireless communication environment.

FIG. 17 illustrates a methodology 1700 for reducing power consumption related to coded transmissions, in accordance with one or more aspects set forth herein. At 1702, data packets may be received along with associated parity packets. For example, a series of data packets may be received with a trailing parity packet, such as is described above with regard to FIG. 15. According to another example, data packets may be received with a leading parity packet, as described with regard to FIG. 16. At 1704, data packet correctness may be verified, for instance, by employing a CRC associated with each data packet. If all data packets are verified as being correct, then the parity packet associated with such data packets need not be decoded in order to conserve power. If one or more data packets is corrupt, then the parity packet may be decoded to restore correctness to the corrupt data packet(s) at 1706. In the event that the parity packet leads the data packets, the parity packet can be buffered for delayed decoding in the event that one or more data packets are corrupt, or may be decoded prior to data packet decoding to mitigate a need for performing a CRC protocol on each data packet.

Figure 18:
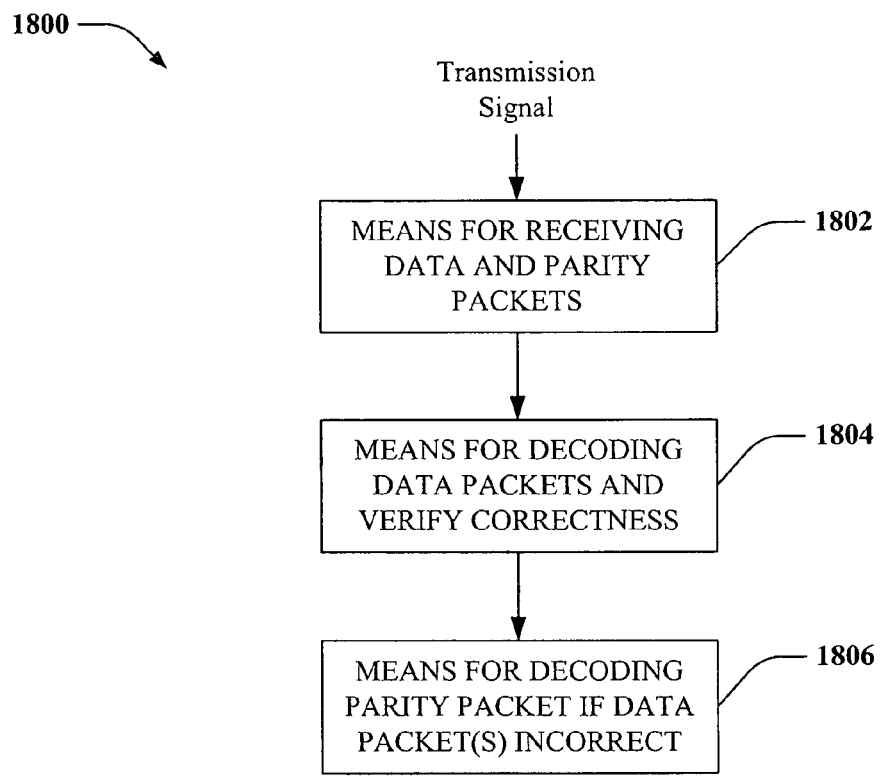
FIG. 18 illustrates an apparatus that facilitates reducing power consumption related to coded transmissions, in accordance with one or more aspects.

FIG. 18 illustrates an apparatus 1800 that facilitates reducing power consumption related to coded transmissions, in accordance with one or more aspects. Apparatus 1800 may comprise means for receiving 1802 a transmission signal, which may comprise data packets and associated parity packets. For example, a series of data packets may be received with a trailing parity packet, such as is described above with regard to FIG. 15. According to another example, data packets may be received with a leading parity packet, as described with regard to FIG. 16. Apparatus 1800 may further comprise means for decoding data packets 1804 and for verifying data packet correctness. Means for decoding data packets 1804 may verify data packet correctness, for instance, by employing a CRC associated with each data packet. It will be appreciated by those skilled in the art that other means of data packet verification may be utilized (e.g., check-sum, or some other suitable verification protocol), and that the aspects described herein are not limited to utilization of a CRC protocol. If all data packets are verified as being correct by means for decoding data packets 1804, then apparatus 1800 need not decode a parity packet associated with the data packets, in order to conserve power. If one or more data packets is determined to be corrupt, then means for decoding the parity packet 1806 can decode the parity packet to restore correctness to the corrupt data packet(s). If the parity packet leads the data packets in the transmission signal, means for receiving 1802 can buffer the parity packet for delayed decoding by means for decoding the parity packet 1806, in the event that one or more data packets are corrupt. Alternatively, means for decoding the parity packet 1806 may decode the parity packet prior to data packet decoding to mitigate a need for performing a CRC protocol on each data packet.

The multiplexing and transmission techniques described herein may be implemented by various means. For example, these techniques may be implemented in hardware, software, or a combination thereof. For a hardware implementation, the processing units used to perform multiplexing and/or transmission at a base station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to perform the complementary processing at a wireless device may also be implemented within one or more ASICs, DSPs, and so on.

For a software implementation, the techniques described herein may be implemented with modules (e.g., procedures, functions, and so on) that perform the functions described herein. The software codes may be stored in a memory unit (e.g., memory unit 1142 or 1262) and executed by a processor (e.g., controller 1140 or 1260). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of wireless communications, comprising:
using an antenna of an apparatus for receiving data packets, cyclic redundancy check (CRC) segments and parity packets in a superframe, wherein a parity packet is associated with one or more data packets;
buffering the parity packets in a buffer of the apparatus;
when the parity packets are received after the data packets:
detecting, at the apparatus, whether the data packets are incorrect using the CRC segments;
after the detecting, reducing power consumption by omitting to decode and deleting the parity packets from the buffer of the apparatus if all data packets are valid; and
decoding parity packets for error correction only if a data packet is determined to be incorrect; and
when the parity packets are received prior to the data packets:
decoding the parity packets; and
decoding the data packets without employing a CRC protocol if none of the of the data packets are corrupt.

2. The method of claim, further comprising receiving the parity packets after receiving the data packets.

3. The method of claim 2, further comprising decoding a data packet and employing information contained in a CRC segment of the data packet to validate the data packet.

4. The method of claim 3, further comprising decoding the parity packet if at least one of the one or more data packets is invalid.

5. The method of claim 1, further comprising decoding the parity packet before decoding the one or more data packets and determining whether the one or more data packets are corrupt to reduce latency when the parity packets are received prior to the data packets.

6. The method of claim 1, further comprising decoding a data packet and employing information contained in a CRC segment of the data packet to validate the data packet when the parity packets are received after the data packets.

7. The method of claim 6, further comprising decoding the parity packet if at least one of the one or more data packets is invalid when the parity packets are received after the data packets.

8. The method of claim 6, further comprising reducing power consumption by omitting to decode the parity packet if all of the one or more data packets are valid as determined by respective CRCs when the parity packets are received after the data packets.

9. An apparatus for facilitating conserving power during receipt of coded transmissions in a wireless communication environment, comprising:
a receiver configured to receive data packets, cyclic redundancy check (CRC) segments and parity packets in a superframe, and to buffer the parity packets in a buffer, wherein a parity packet is associated with one or more data packets; and
a processor configured to:
when the parity packets are received after the data packets:
detect errors based on the CRC segments;
determine whether to decode the parity packets based at least in part on the detected errors related to data packet corruption; and
reduce power consumption after the detection by omitting to decode and deleting the parity packets from the buffer if all data packets are valid; and
when the parity packets are received prior to the data packets:
decode the parity packets; and
decode the data packets without employing a CRC protocol if none of the one or more data packets are corrupt.

10. The apparatus of claim 9, wherein the receiver is operable to receive the parity packet after the one or more data packets associated therewith.

11. The apparatus of claim 10, wherein the processor is operable to evaluate data packet validity for each data packet to determine whether the data packet is corrupt.

12. The apparatus of claim 10, wherein the processor is operable to decode a data packet and employ information contained in a CRC segment of the data packet to validate the data packet.

13. The apparatus of claim 12, wherein the processor is operable to decode the parity packet if at least one of the one or more data packets is corrupt.

14. The apparatus of claim 9, wherein the processor is operable to decode the parity packet before decoding the one or more data packets and to determine whether the one or more data packets are corrupt to reduce latency when the parity packets are received prior to the data packets.

15. The apparatus of claim 9, wherein the processor is operable to decode a data packet employing information contained in a CRC segment of the data packet to validate the data packet when the parity packets are received after the data packets.

16. The apparatus of claim 15, wherein the processor is operable to decode the parity packet if at least one of the one or more data packets is invalid.

17. The apparatus of claim 15, wherein the processor is operable to reduce power consumption by omitting to decode the parity packet if all of the one or more data packets are valid as determined by respective CRCs when the parity packets are received after the data packets.

18. A receiving unit, comprising:
means for receiving data packets, cyclic redundancy check (CRC) segments and parity packets in a superframe, wherein a parity packet is associated with one or more data packets;
means for buffering the parity packets in a buffer;
means for detecting whether the data packets are incorrect using the CRC segments when the parity packets are received after the data packets;
means for, after the detecting, reducing power consumption by omitting to decode and deleting the parity packets from the buffer if all data packets are valid when the parity packets are received after the data packets;
means for decoding the buffered parity packets for error correction only if a data packet is determined to be incorrect when the parity packets are received after the data packets;

means for decoding the parity packets when the parity packets are received prior to the data packets; and means for decoding the data packets without employing a CRC protocol if none of the of the data packets are corrupt when the parity packets are received prior to the data packets.

19. The receiving unit of claim 18, the means for receiving is operable to receive a set of data packets followed by an associated parity packet.

20. The receiving unit of claim 19, the means for detecting comprises means for performing the CRC protocol when the parity packets are received after the data packets.

21. The receiving unit of claim 18, the means for receiving is operable to receive the parity packet prior to receiving one or more data packets associated with the parity packet.

22. A non-transitory computer-readable medium embodying a method of wireless communications, comprising instructions for:

receiving data packets, cyclic redundancy check (CRC) segments and parity packets in a superframe, wherein a parity packet is associated with one or more data packets;

buffering the parity packets in a buffer of an apparatus;

when the parity packets are received after the data packets:
detecting, at the apparatus, whether the data packets are incorrect using the CRC segments;
after the detecting, reducing power consumption by omitting to decode and deleting the parity packets from the buffer of the apparatus if all data packets are valid; and
decoding parity packets for error correction only if a data packet is determined to be incorrect; and when the parity packets are received prior to the data packets:
decoding the parity packets; and
decoding the data packets without employing a CRC protocol if none of the of the data packets are corrupt.

23. The non-transitory computer-readable medium of claim 22, further comprising instructions for receiving a set of data packets prior to receiving an associated parity packet.

24. The non-transitory computer-readable medium of claim 23, further comprising instructions for performing the CRC protocol when the parity packets are received after the data packets.

25. The non-transitory computer-readable medium of claim 22, further comprising instructions for receiving the parity packet prior to receiving one or more data packets associated with the parity packet.

26. A method of wireless communications, comprising:
using an antenna of an apparatus for receiving data packets, cyclic redundancy check (CRC) segments and parity packets in a superframe, wherein a parity packet is associated with one or more data packets;
buffering the parity packets in a buffer of the apparatus;
when the parity packets are received after the data packets:
detecting, at the apparatus, whether the data packets are incorrect using the CRC segments;
reducing power consumption, at the apparatus, by omitting to decode and deleting the parity packets from the buffer if all data packets are valid; and
decoding, at the apparatus, parity packets for error correction only if a data packet is determined to be incorrect; and
when the parity packets are received after the data packets:
decoding, at the apparatus the parity packet before decoding the one or more data packets; and
determining, at the apparatus, whether the one or more data packets are corrupt to reduce latency.

27. An apparatus for facilitating conserving power during receipt of coded transmissions in a wireless communication environment, comprising:
a receiver configured to receive data packets, cyclic redundancy check (CRC) segments and parity packets in a superframe, and to buffer the parity packets in a buffer, wherein a parity packet is associated with one or more data packets;
a processor configured to:
when the parity packets are received after the data packets:
detect errors based on the CRC segments
determine whether to decode the parity packets based at least in part or the detected errors related to data packet corruption; and
reduce power consumption by omitting to decode and deleting the parity packets from the buffer if all data packets are valid; and
when the parity packets are received after the data packets:
decode the parity packet before decoding the one or more data packets; and
determine whether the one or more data packets are corrupt to reduce latency.

28. A receiving unit, comprising:
means for receiving data packets, cyclic redundancy check (CRC) segments and parity packets in a superframe, wherein a parity packet is associated with one or more data packets;
means for buffering the parity packets in a buffer;
means for detecting whether the data packets are incorrect using the CRC segments when the parity packets are received after the data packets;
means for reducing power consumption by omitting to decode and deleting the parity packets from the buffer if all data packets are valid when the parity packets are received after the data packets;
means for decoding the buffered parity packets for error correction only if a data packet is determined to be incorrect when the parity packets are received after the data packets;
means for decoding a parity packet before decoding one or more data packets when the parity packets are received prior to the data packets; and
means for determining whether the one or more data packets are corrupt to reduce latency when the parity packets are received prior to the data packets.

29. A non-transitory computer-readable medium embodying a method of wireless communications, comprising instructions for:
receiving data packets, cyclic redundancy check (CRC) segments and parity packets in a superframe, wherein a parity packet is associated with one or more data packets;
buffering the parity packets in a buffer;
when the parity packets are received after the data packets:
detecting whether the data packets are incorrect using the CRC segments;
reducing power consumption by omitting to decode and deleting the parity packets from the buffer if all data packets are valid; and
decoding parity packets for error correction only if a data packet is determined to be incorrect; and when the parity packets are received after the data packets:
  decoding the parity packet before decoding the one or more data packets; and
determining whether the one or more data packets are corrupt to reduce latency.

* * * * *